(12) United States Patent
Jiang et al.

(10) Patent No.: US 12,423,317 B1
(45) Date of Patent: Sep. 23, 2025

(54) COMMAND SEARCH FOR AN INTEGRATED APPLICATION

(71) Applicant: Notion Labs, Inc., San Francisco, CA (US)

(72) Inventors: Jiahui Jiang, New York, NY (US); Tyrus Miles, New York, NY (US); Abhay Buch, San Francisco, CA (US); Siyu Zhao, San Francisco, CA (US)

(73) Assignee: Notion Labs, Inc., San Francisco, CA (US)

( * ) Notice: Subject to any disclaimer, the term of this patent is extended or adjusted under 35 U.S.C. 154(b) by 0 days.

(21) Appl. No.: 18/909,840

(22) Filed: Oct. 8, 2024

Related U.S. Application Data

(60) Provisional application No. 63/670,358, filed on Jul. 12, 2024.

(51) Int. Cl.
*G06F 7/00* (2006.01)
*G06F 16/248* (2019.01)

(52) U.S. Cl.
CPC .................. *G06F 16/248* (2019.01)

(58) Field of Classification Search
CPC ............. G06F 16/2425; G06F 16/2428; G06F 16/2455; G06F 16/248; G06F 16/243; G06F 16/14; G06F 16/38; G06F 16/24578; G06F 16/245; G06F 16/2477; G06F 16/287; G06F 16/9558; G06F 16/9535; G06F 40/56; G06F 40/58; G06F 40/205; G06F 40/40; G06F 3/0482; G06F 3/04883

See application file for complete search history.

(56) References Cited

U.S. PATENT DOCUMENTS

| | | | |
|---|---|---|---|
| 12,118,513 B1* | 10/2024 | Lu | G06F 40/40 |
| 2008/0133501 A1* | 6/2008 | Andersen | G06F 16/9535 |
| | | | 707/999.005 |
| 2015/0242422 A1* | 8/2015 | Shapira | G06F 16/954 |
| | | | 707/722 |
| 2022/0357977 A1* | 11/2022 | Kalou | G06Q 10/06393 |
| 2023/0394377 A1* | 12/2023 | Yu | G06Q 10/02 |

* cited by examiner

*Primary Examiner* — Mohammad A Sana
(74) *Attorney, Agent, or Firm* — Perkins Coie LLP; Alberto Araiza

(57) ABSTRACT

A system detects a search command input to a computing device and opens a search application in a foreground of the computing device. The search application is configured to search a workspace of an integrated application. The system displays a user interface of the search application on the computing device. The user interface is configured to receive search inputs used to search the workspace and present search results that satisfy the search inputs based on content of the workspace. The system searches the workspace based on a particular search input and causes the computing device to present at least an indication of a particular search result in the user interface of the search application running in the foreground of the computing device. The particular search result can include particular content of the workspace that satisfies the particular search input.

20 Claims, 15 Drawing Sheets

FIG. 4C

COMMAND SEARCH FOR AN INTEGRATED APPLICATION

CROSS-REFERENCE TO RELATED APPLICATIONS

This application claims the benefit of priority to U.S. Provisional Application No. 63/670,358, filed Jul. 12, 2024, which is incorporated by reference herein in its entirety.

BACKGROUND

An integrated application can refer to a software application with multiple functionalities or modules that are combined into a single, cohesive platform. This integration allows for seamless interaction between different components, improving efficiency, user experience, and data consistency. Such applications can include integrated applications (e.g., digital workspaces) referring to environments that assemble tools and platforms that allow users to work, communicate, and produce work products together. Workspaces can include compilations of electronic documents that can be organized within the workspace.

BRIEF DESCRIPTION OF THE DRAWINGS

Reference will now be made, by way of example, to the accompanying drawings which show example embodiments of the present application, and in which:

FIGS. 4A-4C illustrate an AI assistant functionality for an integrated application.

Figure 1:
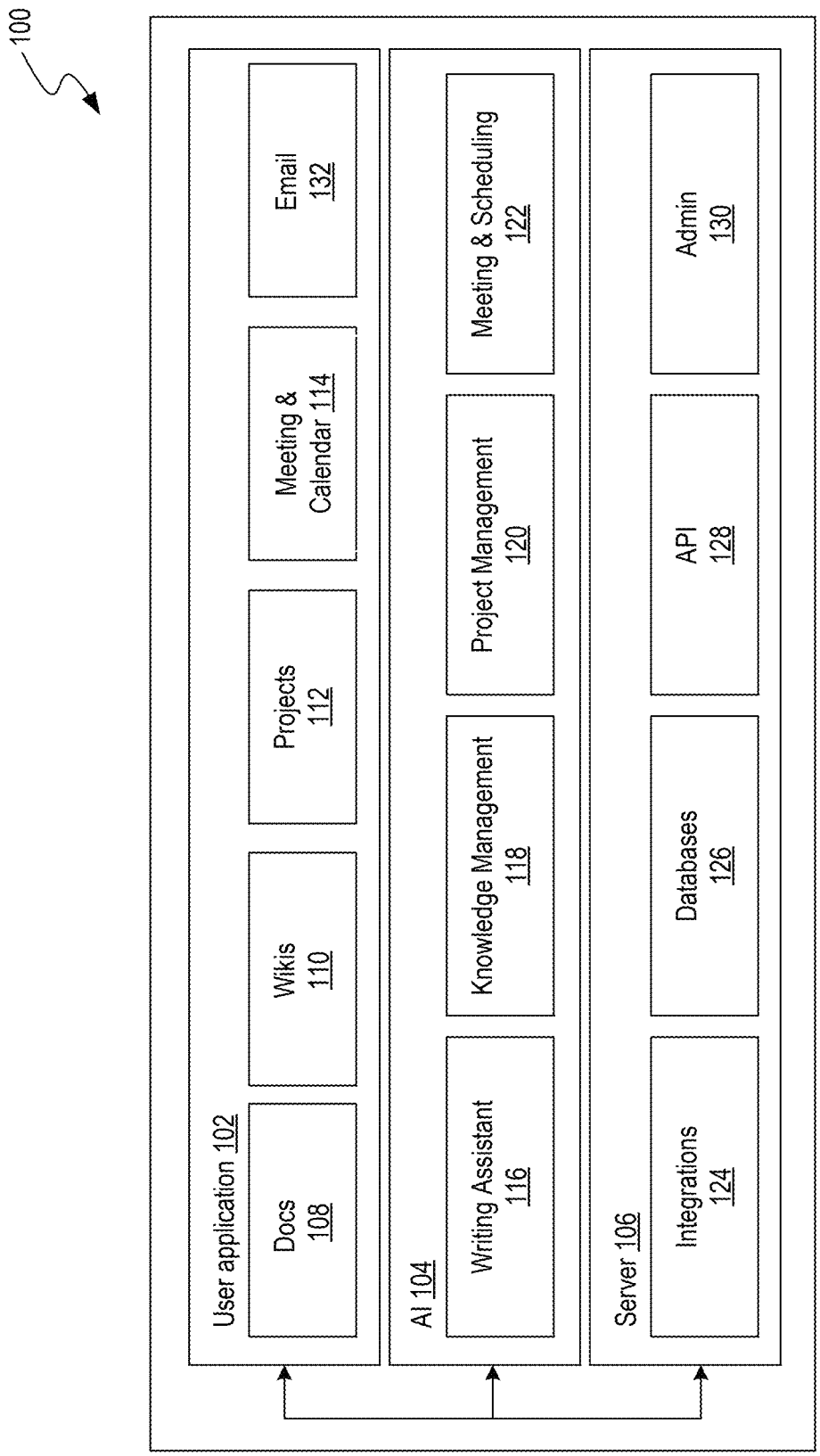
FIG. 1 is a block diagram illustrating a platform, which may be used to implement examples of the present disclosure.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology provides for a command search and AI assistant functionalities for an integrated application that can be used while the integrated application itself is not open on a desktop. The present technology facilitates searching content from the integrated application efficiently without the need of opening the integrated application. Desired content can be opened directly from the search results. The content can include, for example, content in electronic documents, knowledge databases (wikis), calendars, project management tools, and emails. The present technology also facilitates causing an AI assistant to provide AI generated content based on a prompt and content in the integrated application without the need of opening the integrated application. In some implementations, the present technology can provide the command search and the AI assistant functionalities directed to content of a third-party application that is accessible by the integrated application. The third-party application and the integrated application can be coupled via a unique user identifier and the third-party application can be accessible by the integrated application.

Specifically, the present technology addresses the issue of context switching when users need to find content from an integrated application while currently not using the application (e.g., and while using another application) without disrupting their workflow. The present technology allows users to search for and access content from an integrated application, as well as generating AI-based content based on content from the integrated application, without opening the integrated application. The present technology facilitates integrated and seamless command search and AI assistant experience within an integrated application, thereby enhancing the overall user experience.

In one example, a system detects a search command input to a computing device. In response to the search command being detected, the instructions can cause the computing device to open a search application in a foreground of the computing device. The search application can be configured to search a workspace of an integrated application in a background of the computing device. The system can cause the system to display a graphical user interface of the search application on the computing device. The graphical user interface can be configured to receive search inputs used to search the workspace in the background of the computing system and present search results that satisfy the search inputs based on content of the workspace. The system can search the workspace based on a particular search input to the graphical user interface of the search application while the integrated application runs in the background of the computing device. The system can cause the computing device to present at least an indication of a particular search result in the graphical user interface of the search application running in the foreground of the computing device. The particular search result can include particular content of the workspace that satisfies the particular search input.

In another example, a method includes detecting a search command input to a computing device. In response to the search command being detected, the method can include causing the computing device to open a search application in a foreground of the computing device. The search application can be configured to search blocks of an integrated application in a background of the computing device. The blocks include searchable content. The method can include displaying a graphical user interface of the search application on the computing device. The graphical user interface can be configured to receive search inputs used to search the blocks in the background of the computing system and present search results that satisfy the search inputs based on content of the blocks. The method can include searching the blocks based on a particular search input to the graphical user interface of the search application while the integrated application runs in the background of the computing device. The method can include causing the computing device to present at least an indication of a particular search result in the graphical user interface of the search application running in the foreground of the computing device. The particular search result can include particular content of the blocks that satisfies the particular search input.

In yet another example, a system detects a search command input to a computing device. In response to the search command being detected, the system can open a search application in a foreground of the computing device. The search application can be configured to search blocks of an integrated application in a background of the computing device. The blocks can include searchable content. The system can display a graphical user interface of the search application on the computing device. The graphical user interface can be configured to receive search inputs used to search the blocks in the background of the computing system and present search results that satisfy the search inputs based on content of the blocks. The system can cause a server in communication with the computing device to search the blocks based on a particular search input to the graphical user interface of the search application while the integrated application runs in the background of the computing device. The system can cause the computing device to present at least an indication of a particular search result in the graphical user interface of the search application running in the foreground of the computing device. The particular search result can include particular content of the blocks that satisfies the particular search input.

In yet another example, a system detects a command input to launch an assistant application at a computing device. The assistant application can be configured to use an AI system to generate content responsive to prompts input and based on content of an integrated application. In response to the command being detected, the system can cause the computing device to open the assistant application in a foreground of the computing device. The system can cause the computing device to display a graphical user interface of the assistant application at the computing device. The graphical user interface can be configured to receive the prompts for the AI system and present generated content responsive to the prompt inputs. The system can cause the AI system to generate content responsive to a particular prompt input to the graphical user interface. The particular prompt can include a criterion for particular content of a workspace of the integrated application. The generated content can be responsive to the particular prompt based on the particular content of the workspace. The system can cause the computing device to present the generated content responsive to the particular prompt within the graphical user interface while the assistant application is running in the foreground of the computing device and the integrated application is running in the background of the computing device.

In yet another example, a method performed by a system includes detecting a command input to launch an assistant application at a computing device. The assistant application can be configured to use an AI system to generate content responsive to prompts input and based on content of an integrated application. In response to the command being detected, the method can include causing the computing device to open the assistant application in a foreground of the computing device. The method can include causing the computing device to display a graphical user interface of the assistant application at the computing device. The graphical user interface can be configured to receive the prompts for the AI system and present generated content responsive to the prompt inputs. The method can include causing the AI system to generate content responsive to a particular prompt input to the graphical user interface. The method can include causing the computing device to present the generated content responsive to the particular prompt within the graphical user interface while the assistant application is running in the foreground of the computing device and the integrated application is running in the background of the computing device.

In yet another example, a system detects a command input to launch an assistant application at a computing device. The assistant application can be configured to use an AI system to generate content responsive to prompts input and based on content of an integrated application. In response to the command being detected, the system can cause the computing device to: open the assistant application in a foreground of the computing device. The system can cause the computing device to display a graphical user interface of the assistant application at the computing device. The graphical user interface can be configured to receive the prompts for the AI system and present generated content responsive to the prompt inputs. The system can cause the AI system to generate content responsive to a particular prompt input to the graphical user interface. The system can cause the computing device to present the generated content responsive to the particular prompt within the graphical user interface while the assistant application is running in the foreground of the computing device and the integrated application is running in the background of the computing device.

In yet another example, a system detects a command input to launch a secondary application in a foreground of a computing device. The secondary application can be configured to present content of an integrated application running in a background of the computing device and of a third-party application accessible by the integrated application. The secondary application and the integrated application can be coupled via a unique user identifier and the third-party application is accessible by the integrated application via an application programming interface (API). In response to the command being detected, the system can cause the computing device to open the secondary application in the foreground of the computing device and display a graphical user interface of the secondary application at the computing device. The graphical user interface can be configured to receive user inputs and present content responsive to the user inputs. In response to a particular user input received at the graphical user interface, the system can search the third-party application or the integrated application for particular content of the third-party application that satisfies a criterion included in the particular user input. The system can cause the computing device to present at least an indication of the particular content of the third-party application within the graphical user interface of the secondary application running in the foreground of the computing device.

In some implementations, a method performed by a system includes detecting a command input to launch a secondary application in a foreground of a computing device. The secondary application can be configured to present content of an integrated application running in a background of the computing device and of a third-party application accessible by the integrated application. The secondary application and the integrated application can be coupled via a unique user identifier and the third-party application can be accessible by the integrated application via an application programming interface (API). In response to the command being detected, the method can include causing the computing device to open the secondary application in the foreground of the computing device. The method can include displaying a graphical user interface of the secondary application at the computing device. The graphical user interface can be configured to receive user inputs and present content responsive to the user inputs. In response to a particular user input received at the graphical user interface, the method can include searching the third-party application or the integrated application for particular content of the third-party application that satisfies a criterion included in the particular user input. The method can include causing the computing device to present at least an indication of the particular content of the third-party application within the graphical user interface of the secondary application running in the foreground of the computing device.

In some implementations, a system detects a command input to launch a secondary application in a foreground of a computing device. The secondary application can be configured to present content of an integrated application running in a background of the computing device and of a third-party application accessible by the integrated application. The secondary application and the integrated application can be coupled via a unique user identifier and the third-party application can be accessible by the integrated application via an application programming interface (API). In response to the command being detected, the system can cause the computing device to open the secondary application in the foreground of the computing device. The system can cause displaying a graphical user interface of the secondary application at the computing device. The graphical user interface can be configured to receive user inputs and present content responsive to the user inputs. In response to a particular user input received at the graphical user interface, the system can search the third-party application or the integrated application for particular content of the third-party application that satisfies a criterion included in the particular user input. The system can cause the computing device to present at least an indication of the particular content of the third-party application within the graphical user interface of the secondary application running in the foreground of the computing device.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested sub-pages inside of pages). The content attribute of a block stores the array of block IDs (or pointers) referencing those nested blocks. Each block defines the position and order in which its content blocks are rendered. This hierarchical relationship between blocks and their render children are referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface-typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No"]]). The client builds operations to represent the creation of a new block with those attributes. New blocks are not created in isolation: blocks are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into Transaction-Queue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the/saveTransactions API endpoint. Save Transactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database-meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from Message-Store using the WebSocket connection. When a team member opens the same page, the member is subscribed to changes of all those blocks. After changes have been made through the saveTransactions process, the API notifies Mes-sageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example platform 100. The platform 100 provides users with an all-in-one workspace for data and project management. The platform 100 can include a user application 102, an AI tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, a meeting and calendar template 114, and an email template 132. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, emails, and/or other pages (e.g., nested pages or sub-pages). Blocks can be assigned to certain properties. The blocks are defined by boundaries having dimensions. The boundaries can be visible or non-visible for users. For example, a block can be assigned as a text block (e.g., a block including text content), a heading block (e.g., a block including a heading) or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The email template 132 allows the users to customize their inbox by representing the inbox as a customizable database where the user can add custom columns and create custom views with layouts. One view can include multiple layouts including a calendar layout, a summary layout, and urgent information layout. Each view can include a customized structure including custom criteria, custom properties, and custom actions. The custom properties can be specific to a view such as artificial intelligence-extracted properties, and/or heuristic-based properties. The custom actions can trigger automatically when a message enters the view. The custom actions can include deterministic rules like "Archive this," or assistant workflows like responding to support messages by searching user applications 102 or filing support tickets. In addition, the view can include actions, such as buttons, that are custom to the view and perform operations on the messages in the inbox. Only the customized structure can be shared with other users of the system, or both the customized structure and the messages can be shared.

The integration of the docs template 108, the wikis template 110, the projects template 112, the meeting and calendar template 114, and the email template 132 enables linking and embedding of templates within other templates. For example, an email sent from an email address within the platform 100 to another email address within the platform 100, can include an embedding of a document within the platform 100, or an embedding of a block in the document. In another example, a wiki can link to a meeting within the calendar.

The AI tool 104 is an integrated AI assistant that enables AI-based functions for the user application 102. In one example, the AI tool 104 is based on a neural network architecture, such as the transformer 212 described in FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including a text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include auto filling information based on changes within the workspace or automatically track project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 200 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses large language models (LLMs).

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 2:
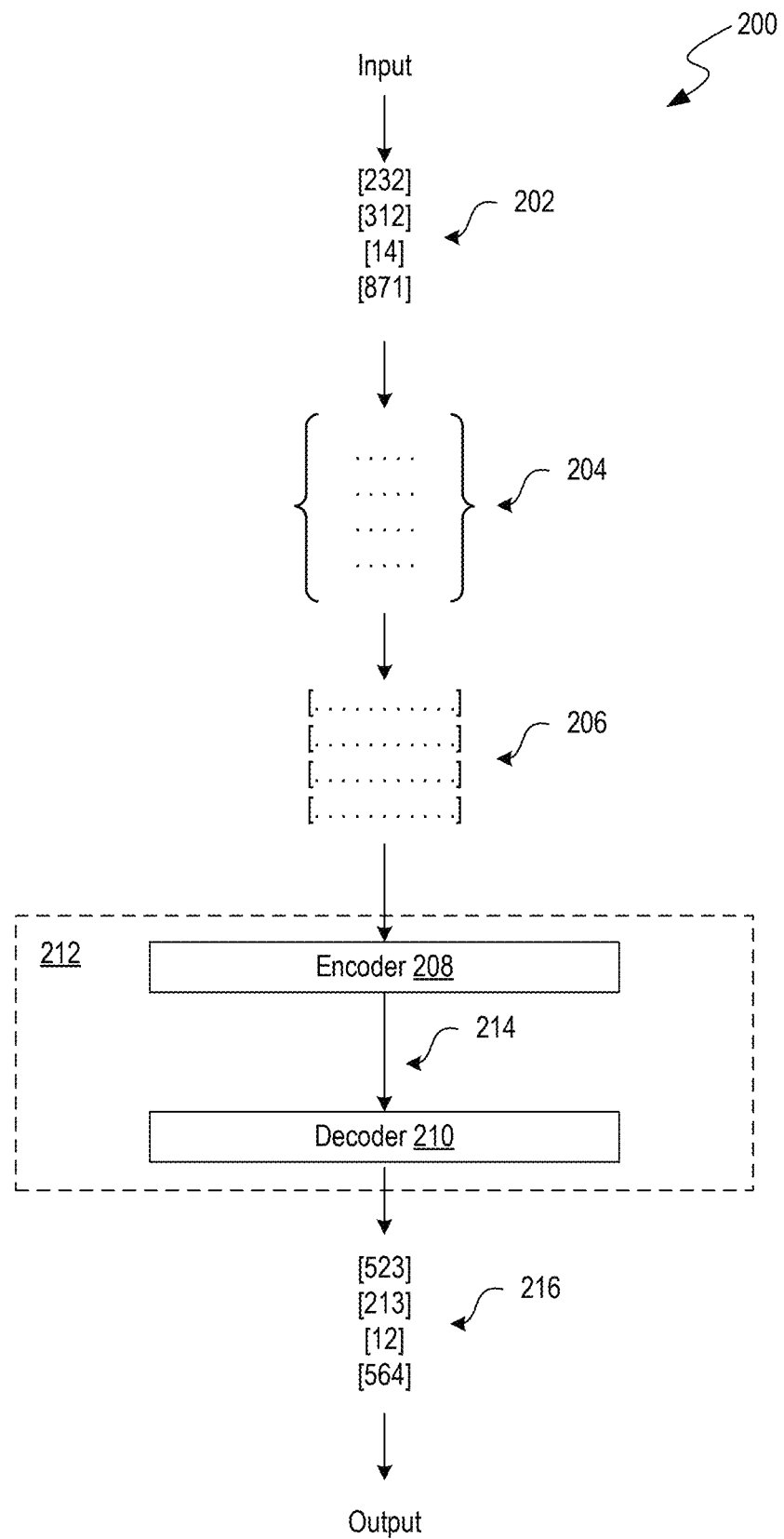
FIG. 2 is a block diagram of a transformer neural network, which may be used in examples of the present disclosure.

FIG. 2 is a block diagram of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as recurrent neural network (RNN)-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Command Search and AI Assistant for an Integrated Application

FIGS. 3A-3D illustrate a command search functionality for an integrated application. The integrated application (e.g., the user application 102 of the platform 100 in FIG. 1) is operated on a computer device (e.g., a computer system 900 in FIG. 9). The computer device is configured to operate multiple applications concurrently. For example, the computer device can concurrently display multiple user interfaces (e.g., windows) that are associated with different applications and/or the operating system of the computer device.

The integrated application can include multiple functionalities combined into a single platform. In some implementations, the integrated application is configured to provide a single platform for task management, project planning, and other productivity features. In some implementations, the integrated application includes a workspace application configured for organizing and managing tasks, projects, and resources (e.g., by the docs template 108, the wikis template 110, the projects template 112, the meeting and calendar template 114, and the email template 132). The integrated application can be based on the block model, as described in the block data model section.

Figure 3A:
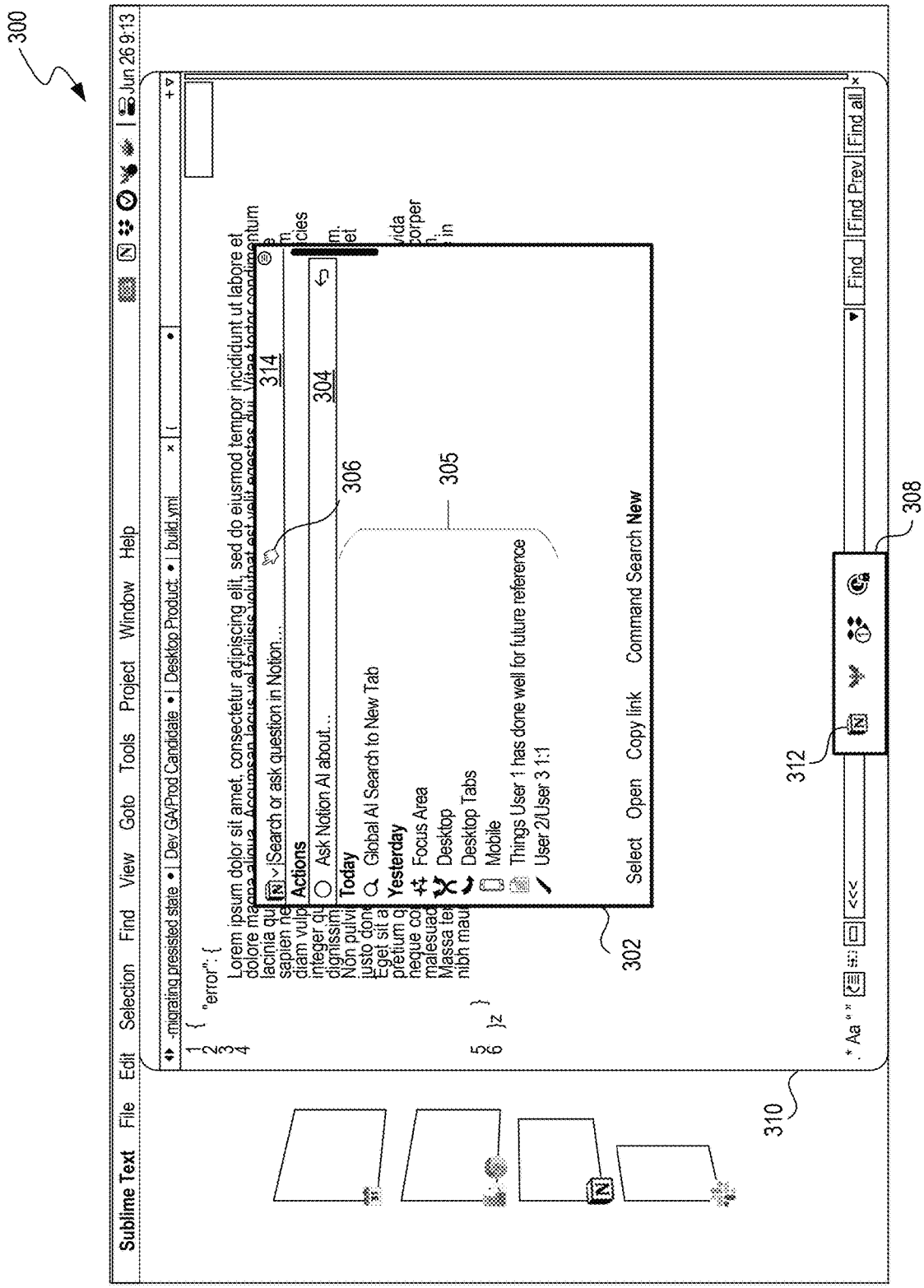
FIGS. 3A-3D illustrate a command search functionality for an integrated application.

FIGS. 3A-3D illustrate a display view 300 of the computer system. In FIG. 3A, the display view 300 includes a command search user interface 302 associated with the integrated application. The command search user interface 302 is displayed as the foremost user interface and is visually overlapping with a user interface 310 which is associated with another application that is different from the integrated application. The display view 300 does not include any other user interfaces or portions of a user interface that belongs to the integrated application.

The display of the command search user interface 302 can be initiated while the integrated application itself is not open. For example, the integrated application can be operating in the background, but a user face of the integrated application is not open on the display view 300. The command search user interface 302 can be initiated while the display view 300 is displaying another application user interface, such as the user interface 310.

The display of the command search user interface 302 can be initiated by a user input. In some implementations, the user input can include a keyboard shortcut input including a combination of keys pressed together. The combination of keys can be pre-determined by a user. In some implementations, the user input can be provided on an interface element, such as an icon (e.g., an icon 312 on a taskbar 308 in FIG. 3A). An interface element refers to a visual element on a graphical user interface that is associated with a particular action or interaction performed in response to receiving an input on the interface element. In some implementations, an interface element is selectable so that a user can provide an input (e.g., a click input) to select to perform the action associated with the interface element. In some implementations, an interface element includes a text field that allows a user to input text inside the interface element (e.g., a text bar). The input can be an input through an input device (e.g., a mouse or a touchpad). The input can include, for example, a click, a double click, a press, a swipe, or a combination thereof when a cursor (e.g., a cursor 306) associated with the output device is positioned over the icon 312.

As shown, the command search user interface 302 can include an input user interface element for providing text or a text string including one or more keywords for performing a search (e.g., a search bar 314). The command search user interface 302 can also include command search suggestions 305. The command search histories can include suggestions based on historical searches a user has performed, content that a user has accessed previously, or content that a user has accessed most frequently. The command search user interface 302 can also include a user interface element for accessing an AI assistant (e.g., an AI assistant interface element 304). The AI functionality is described with respect to FIGS. 4A-4C.

Figure 3B:
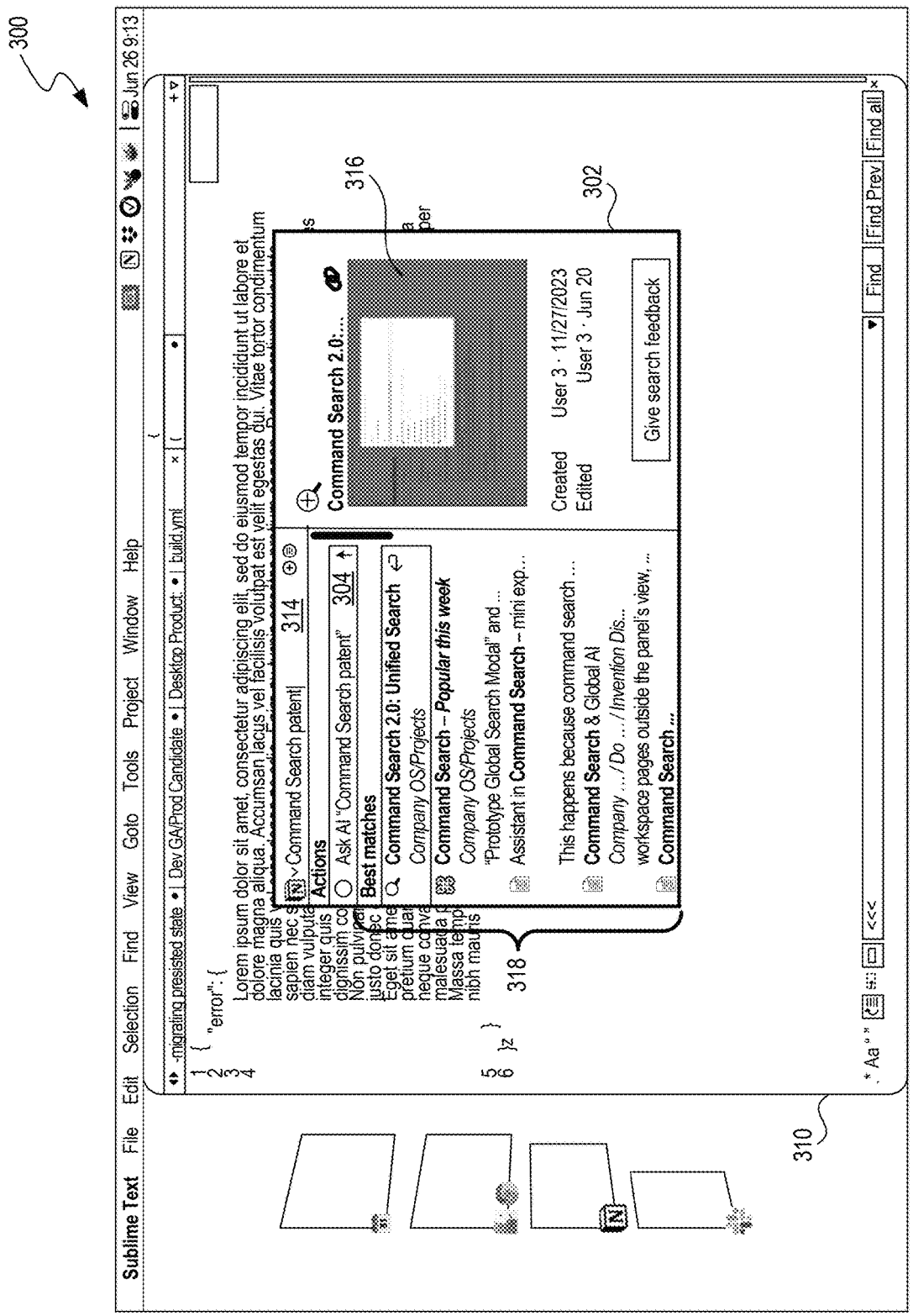

In FIG. 3B, a user has provided an input (e.g., a keyword combination "Command Search Patent") on the search bar t of the command search user interface 302 and initiated a search for content on the integrated application based on the input. In response to the input, search results 318 are displayed on the command search user interface 302. The search results 318 can include links (e.g., Uniform Resource Locator (URL) links). Each link can point to a content on the integrated application. The command search user interface 302 includes a preview section 316. The preview section 316 can display one or more previews of the content pointed to by the links. The preview section 316 can automatically include a preview of a topmost search result in the search results 318 or a preview of selected search results. In some implementations, the system retrieves and displays content of a search result as a preview in the command search user interface 302. For example, a preview can include a first few lines of the content. The preview can be displayed, for example, when a user moves the cursor 306 on top of a particular link in the search results 318 or provides a click input when the cursor 306 is within a threshold distance from the particular link In FIG. 3C, a user has provided an input to select a particular link on the search results 318 (e.g., by an input such as a click input) and in response to the input, a display of an workspace application 320 associated with the integrated application is displayed. The workspace application 320 includes the content associated with the selected link (e.g., a page 322 titled "Command Search and Global AI"). The workspace application 320 also includes a sidebar 324 including multiple interface elements for accessing content or functionalities associated with the integrated application. The sidebar 324 can include an interface element for accessing the command functionality (e.g., a command search interface element 326) when the integrated application is open. In an instance that the integrated application is open, i.e., the workspace application 320 is the foremost user interface on the display view 300, a user input on the command search interface element 326 or the keyboard shortcut input will initiate display of a command search user interface within the workspace application 320. For example, the command search user interface similar to the command search user interface 302 is displayed instead of the page 322 within the workspace application 320 (instead of displaying a separate user interface or a window for the command search user interface).

In some implementations, a user can have access to several user accounts on the integrated application. For example, a user can have a private integrated application account, an account associated with an organization, and an account associated with a subgroup within the organization. In such implementations, the command search user interface 302 can include a workspace switcher that facilitates selection of a desired user account that is used for searching the content. FIG. 3D illustrates the command search user interface 302 of FIG. 3A with a workspace switcher 328. In response to a user input on the workspace switcher 328, the command search user interface 302 can display a list 330 of available accounts (e.g., as a drop-down menu). A user can select the desired account, for example, clicking on the desired account from the list 330. In some implementations, the command search user interface 302 includes another type of control (or an interface element) that allows a user to provide an input to select or define the desired workspace. For example, such control can be an input interface element that allows a user to write an identifier (e.g., a name) of the workspace.

In some implementations, the workspace can be selected automatically based on a predefined selection or an automated selection. For example, the computer device can select a workspace that is associated with the last session of the integrated application. As another example, the computer device can select a workspace that has been defined in the account settings to be a default account for the command search or a workspace based on a particular criterion (e.g., an age of an account or frequency of using an account).

Figure 4A:
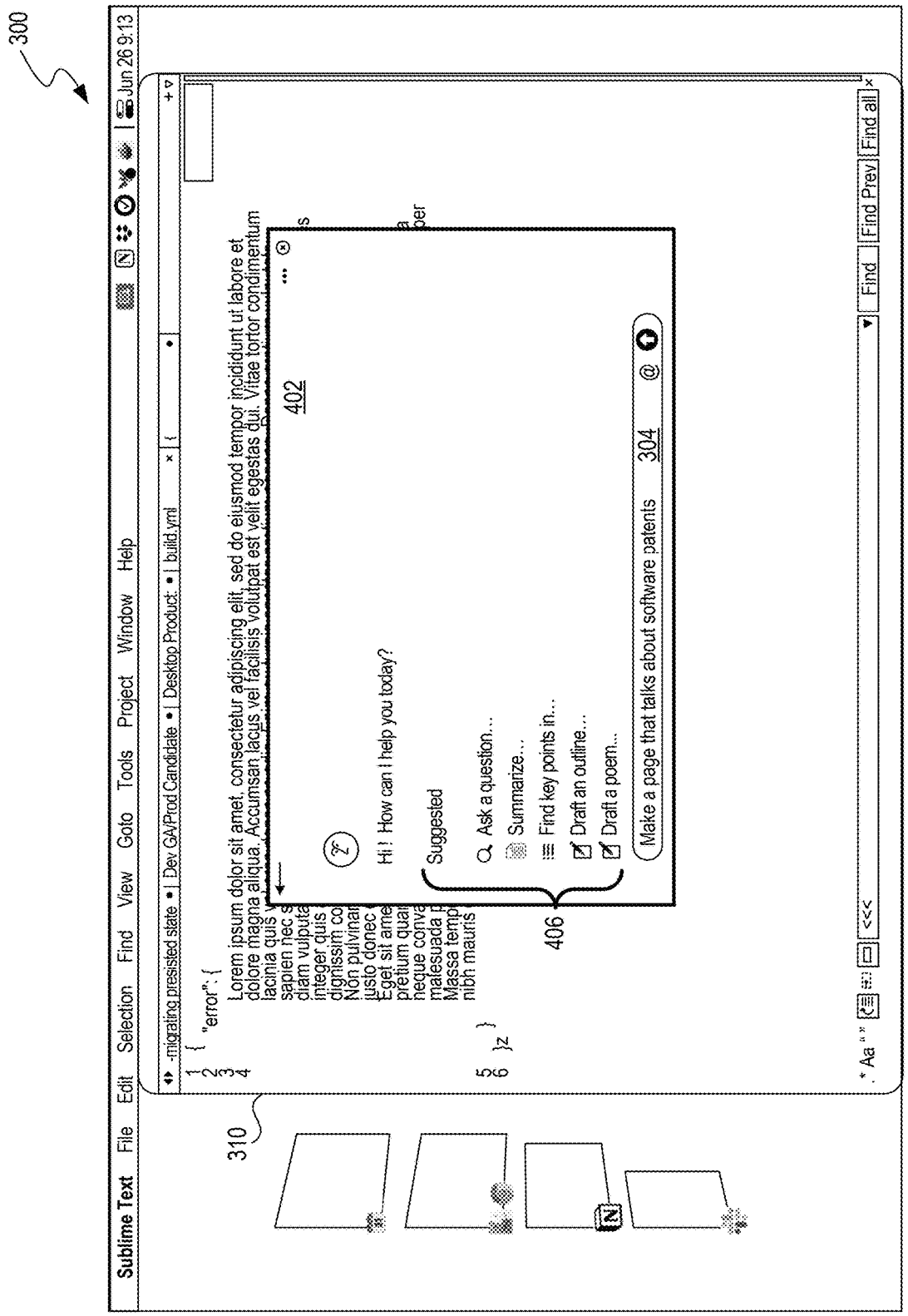
Figure 4B:
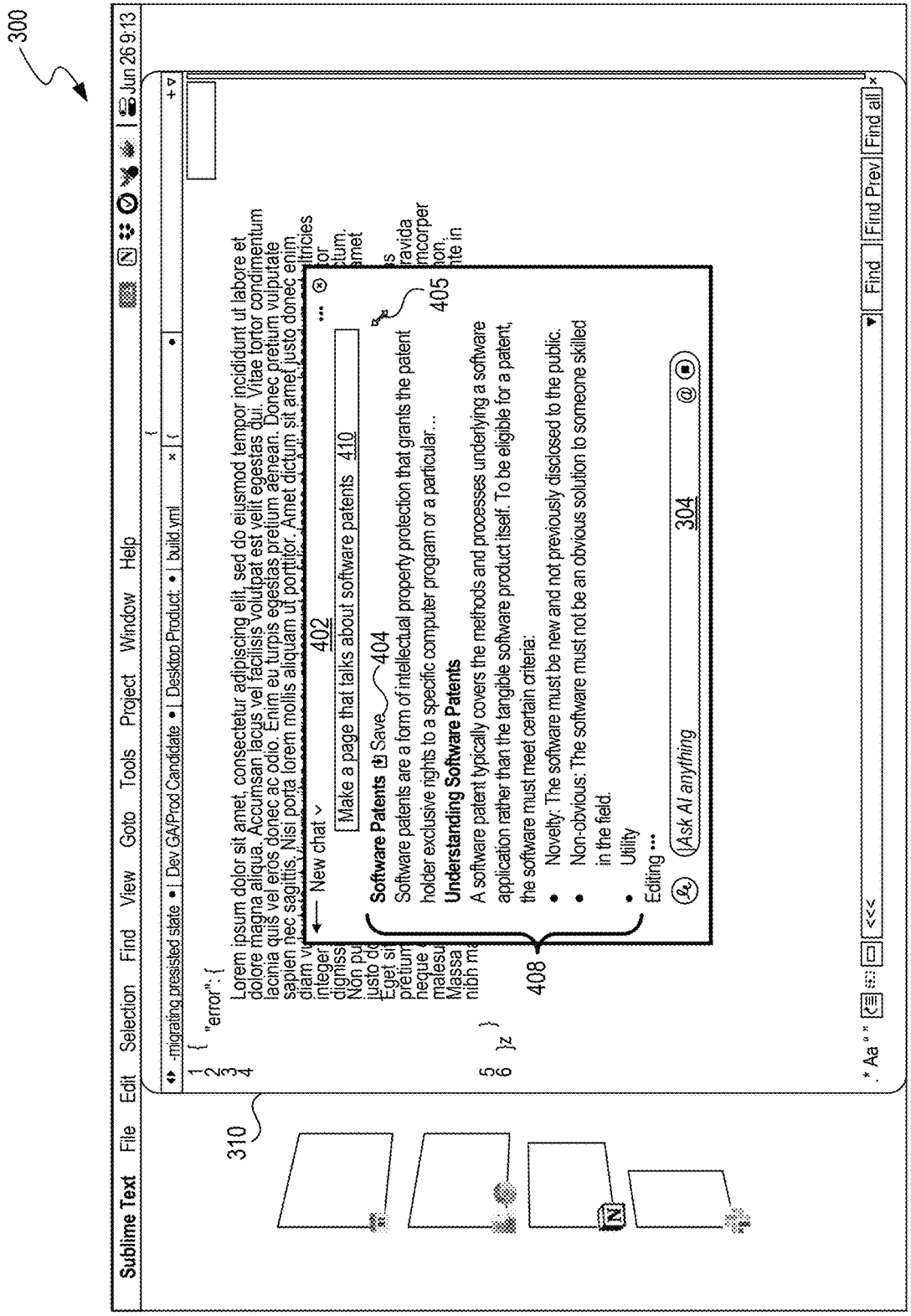
Figure 4C:
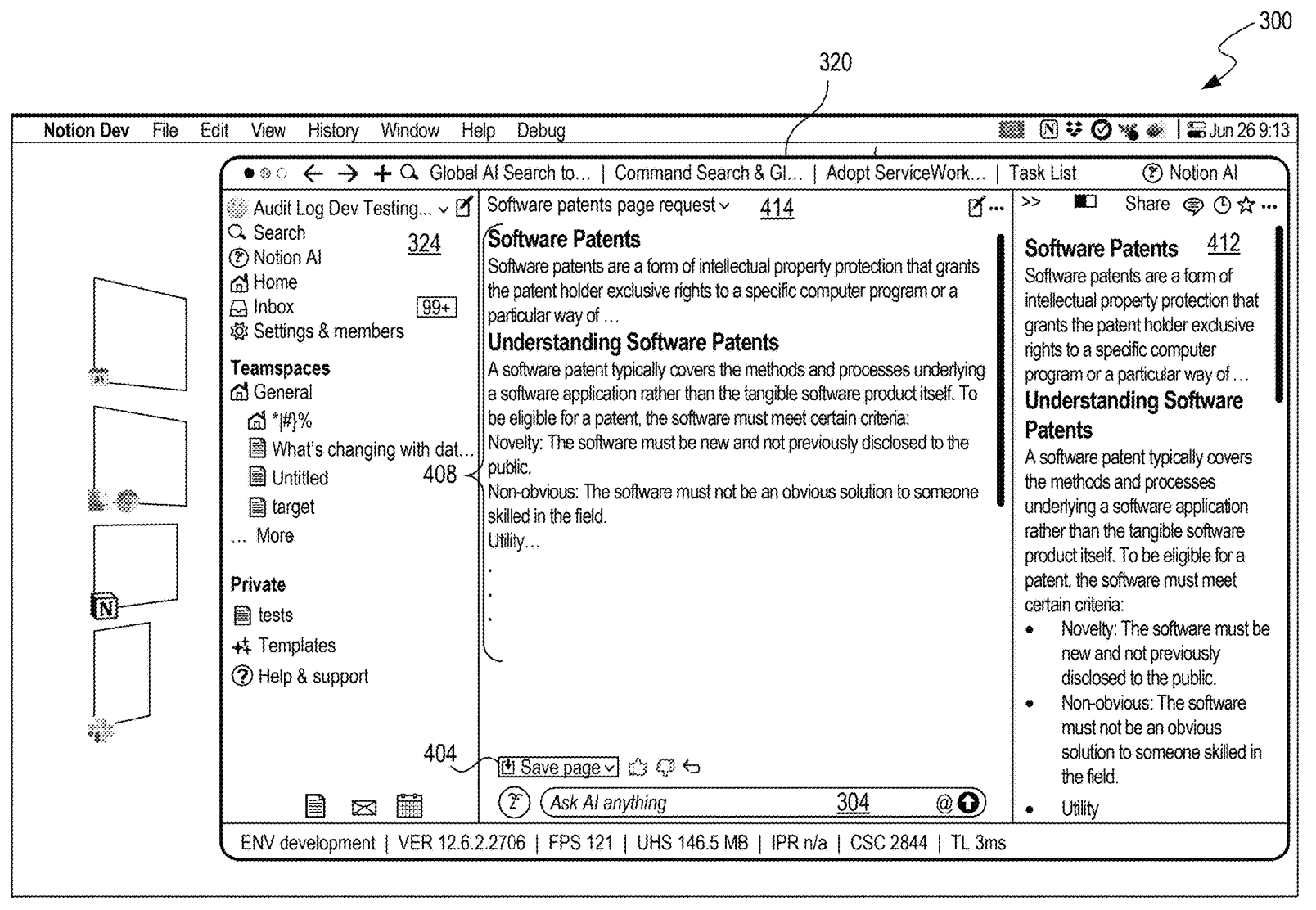

FIGS. 4A-4C illustrate an AI assistant functionality for an integrated application. In FIG. 3A, the display view 300 includes an AI assistant user interface 402 associated with the integrated application. The AI assistant functionality is associated with the AI tool 104 described with respect to FIG. 1. The AI assistant is a generative functionality that is configured to cause a generative AI system (e.g., FIG. 2) to create content (e.g., text) in response to instructions received from a user (e.g., prompts) and content of the integrated application.

Figure 3C:
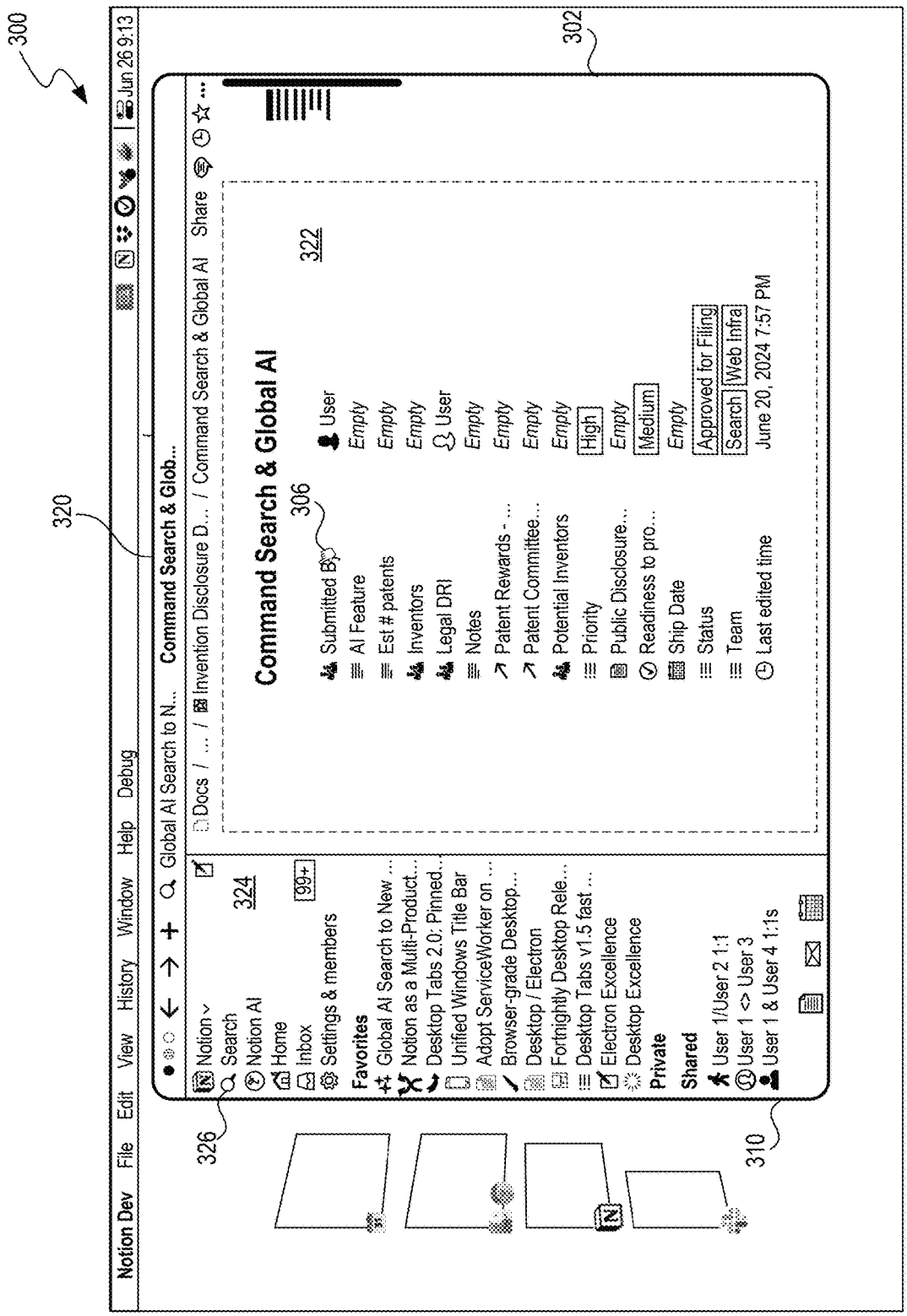
Figure 3D:
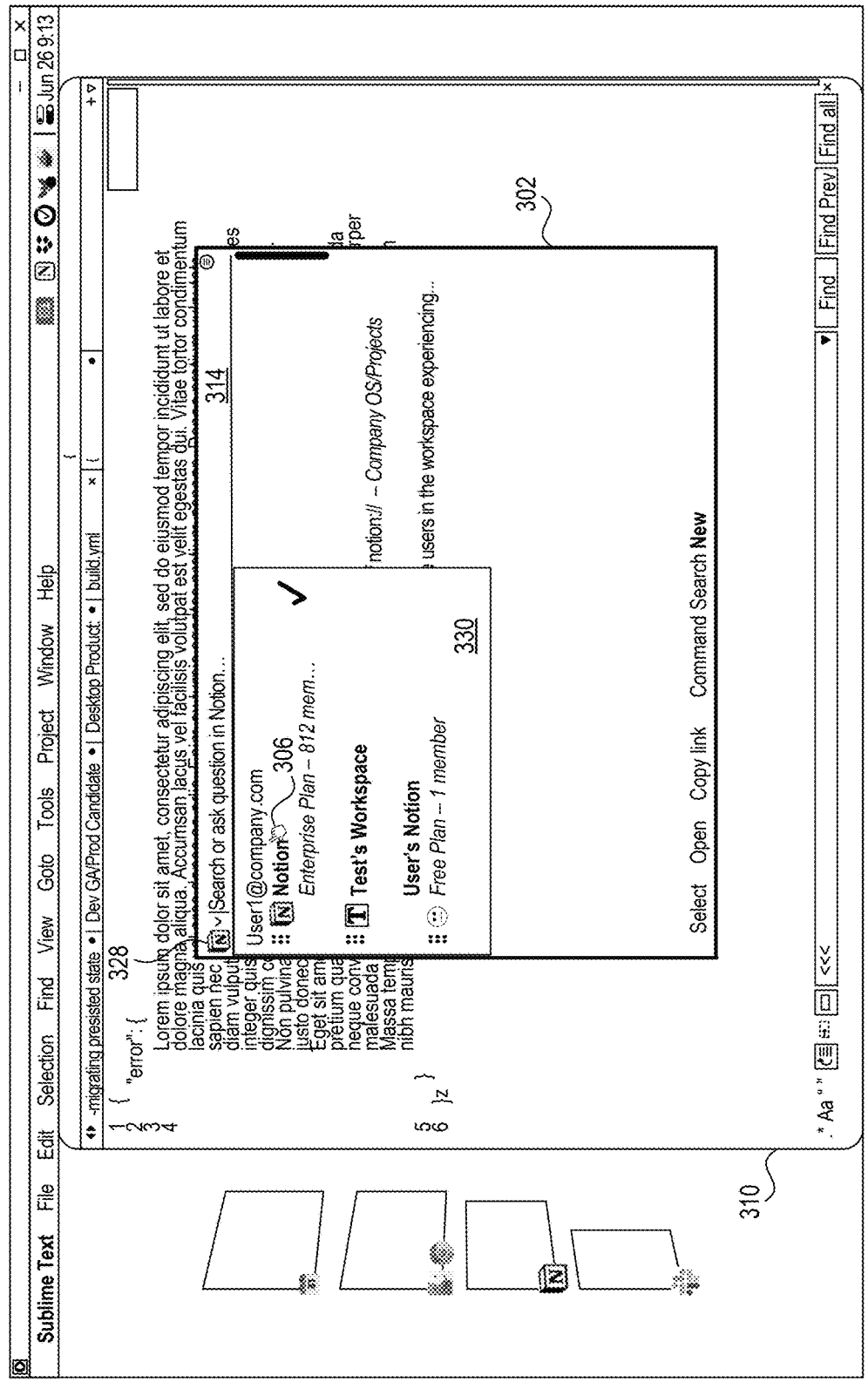

Similar to the command search user interface 302, the AI assistant user interface 402 can be initiated while the integrated application is not open (e.g., the workspace application 320 associated with the integrated application described with respect to FIG. 3C is not displayed). The AI assistant user interface 402 can be initiated by an input. A user can click on an interface element associated with the AI assistant or provide a keyboard shortcut. In some implementations, a first keyboard shortcut is associated with the opening of the command search user interface 302 and a second keyboard shortcut different from the first keyboard shortcut is associated with the opening of the AI assistant user interface 402. The keyboard shortcut for opening the AI assistant user interface 402 can be provided when the command search user interface 302 is displayed, or when a user interface not associated with an integrated application is displayed (e.g., the user interface 310). In some embodiments, the AI assistant user interface 402 can be opened by an input on the AI assistant interface element 304 which is part of the command search user interface 302 in FIG. 3A. Alternatively, a prompt can be provided on the AI assistant interface element 304 on the command search user interface 302 and the generated text content can be provided as described herein with respect to FIGS. 4A through 4C.

As shown, the AI assistant user interface 402 includes the AI assistant interface element 304. A user can provide an input including instructions (a prompt) that cause a generative AI system to create content. The AI system is configured to create the content based on the instructions and based on content (e.g., text content) on the integrated application. As described with respect to FIG. 3D, in an instance that a user is associated with multiple integrated applications, the user can change the integrated application account to be used for creating the content by the AI system from the workspace switcher 328. In FIG. 4A, the user has provided a prompt stating "Make a page that talks about software patents" on the AI assistant interface element 304.

The AI assistant user interface 402 can also include suggested actions (e.g., suggested actions 406). Each suggested action is associated with instructions (prompts) to perform a particular AI-based action (e.g., asking a question, summarizing, drafting text, finding key points within content). The suggested actions 406 can include actions that can be performed with the AI tool 104 described with respect to FIG. 1. The suggested action can include predefined actions, most frequently used actions, or suggested actions based on users prior use or content of the integrated application. A user can select a particular action from the suggested actions 406 by an input (e.g., by providing a click input when a cursor is positioned on the particular action).

In response to providing the instructions (e.g., the prompt "Make a page that talks about software patents" on the AI assistant interface element 304), the AI system is caused to create text content based on the prompt and the text content on the integrated application. FIG. 4B illustrates the AI assistant user interface 402 displaying the created content 408. The content 408 includes a text describing software patents that is generated by the AI system in response to the prompt in FIG. 4A. The AI assistant user interface 402 also includes an indication of the prompt used to create the content 408 (e.g., the prompt indication 410). The AI assistant user interface 402 further includes the AI assistant interface element 304. The user can provide another prompt on the AI assistant interface element 304 to cause the AI system to re-create content by modifying the created content 408 or to create new or to create new content altogether.

The created content 408 can be temporarily saved while it is displayed on the display view 300. For example, the computer device saves the created content 408 on a local or remote temporary memory. The created content can further be saved as a page on the integrated application by an input on a saving interface element 404. The user can also open the created content 408 as a page on the workspace application 320 by an input on a page opening interface element 405.

FIG. 4C illustrates the workspace application 320 displaying a page 414 that includes the created content 408. The page 414 can, for example, include a chat log containing a partial copy of the created content 408 as part of a conversation (or a chat) with the AI system. Alternatively, the page 414 can be a preview of a page that can be created based on the created content 408. The created content 408 can be saved to the integrated application as a page (e.g., by an input on the saving interface element 404). The workspace application 320 also includes the AI assistant interface element 304 that a user can use to provide further prompts to re-create or modify the created content 408 (e.g., to modify) or to create new content. The workspace application 320 also includes a section (or a tab) 412 displaying the created content 408. The section 412 can present the created content 408 for a single prompt in a format that can be saved, e.g., as a page.

In some implementations, the command search user interface 302 described with respect to FIG. 3A and the AI assistant user interface 402 described with respect to FIG. 3B are configured to persist for a threshold period of time even though not displayed in the foreground of the display view 300. The persisting used herein refers to an ability of the user interface to maintain the last content of the user interface for the threshold period of time to be able to display the same content again. The threshold period of time can be, for example, 30 seconds, a minute, two minutes, or five minutes. As an example, a user can close the command search user interface 302 or the AI assistant user interface 402 and reopen the user interface again within the threshold time period. In such instances, the reopened user interface includes the content that was displayed on the command search user interface 302 or the AI assistant user interface 402 at the time when the user interface was closed. The persisting feature can enable the users to conveniently switch between applications and user interfaces without losing the content on the command search user interface 302 or the AI assistant user interface 402.

Figure 5A:
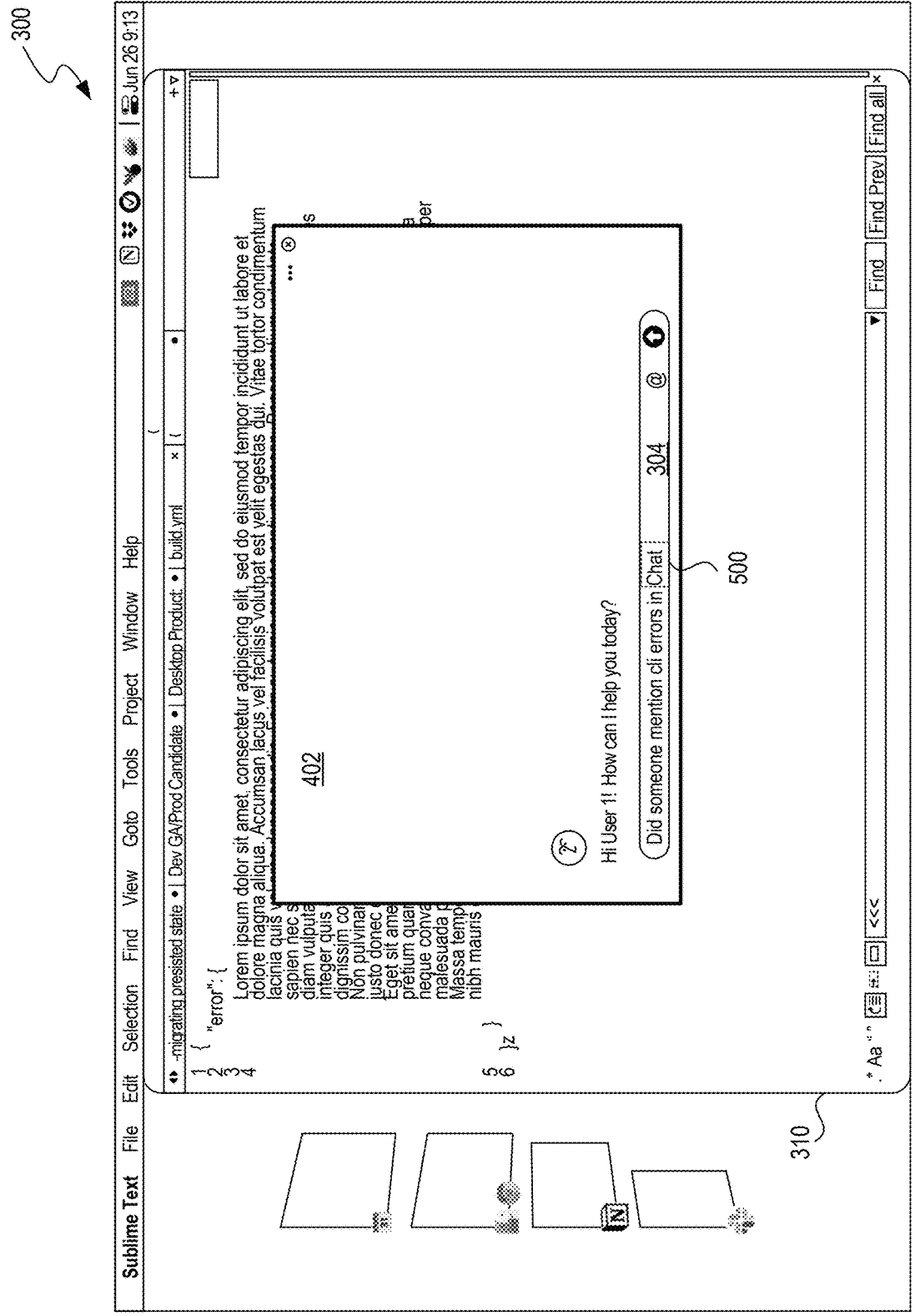
FIGS. 5A and 5B illustrate an AI assistant functionality of an integrated application to access applications associated with the integrated application.
Figure 5B:
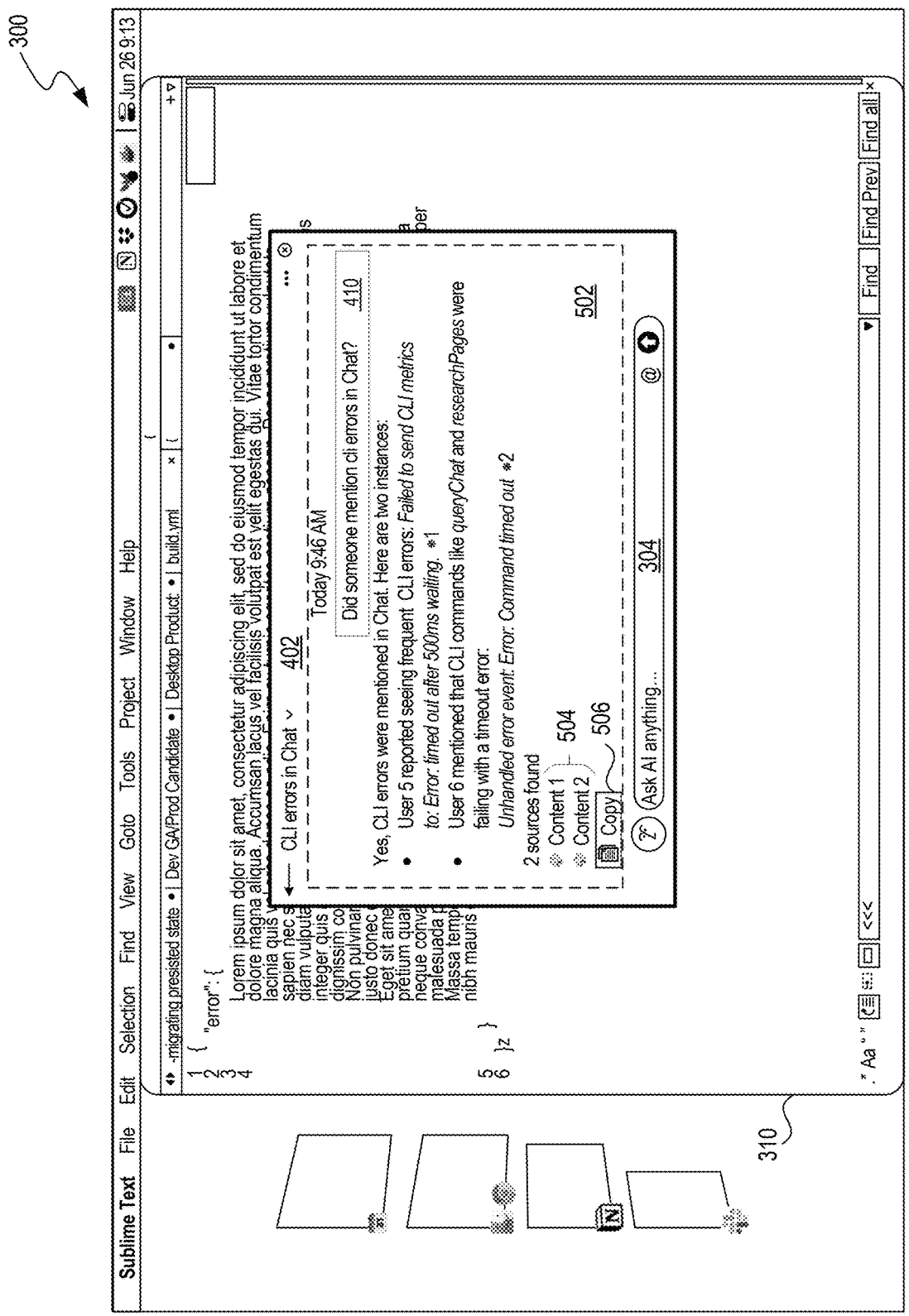

FIGS. 5A and 5B illustrate an AI assistant functionality of an integrated application to access applications associated with the integrated application. In some implementations, the integrated application is associated with (e.g., connected with) one or more other software applications that can be used together with the integrated application (referred to herein as connecter applications). Such connecter applications can include applications provided by third-party software developers and providers that work in collaboration with the software developer of the integrated application. The connecter applications can be connected to the integrated application to allow users a convenient access to functionalities from the third-party software developers and providers. The connecter applications can include additional email, calendar, and project and data management software in addition to features the templates described with respect to user application 102 in FIG. 1. The connecter applications can also include applications that provide additional features and services to the integrated application such as a work tracking application, a project management application, a team communication application (e.g., a team email, messaging or chat application), an electronic message application, a productivity application, or a file storage and synchronization application.

FIG. 5A includes the AI assistant user interface 402 displayed on the display view 300, as described with respect to FIG. 4A. In FIG. 5A, a user has provided a prompt on the AI assistant interface element 304 that identifies a connecter application 500 (e.g., "Chat"). The identification can be done by using the name of the connecter application or other identifying indication associated with the connecter application. As shown, the prompt includes instructions for requesting that the AI system create content in response to the question identified in the prompt ("Did someone mention cli errors in Chat") indicating that the response should be generated based on content of the connecter application which is accesses through the integrated application.

FIG. 5B includes the AI assistant user interface 402 with created content 502 (e.g., as described with respect to FIG. 4B). However, the content 502 is different from the created content 408 in FIG. 4B in that the content 502 is created based on content from the connecter application while content 408 is created based on content from the integrated application. The created content 502 can include a response to the answer in the prompt (e.g., Yes, CLI errors were mentioned in Chat . . . ). The created content 502 can also include links 504 (e.g., URL links) that point to the content on the connecter application that includes the asked information. In some implementation, a user can open the content on the connecter applications by an input on the links 504. A user can save or copy the content by an input on an associated interface element. For example, a user can copy the created content 502 by an input on the copying interface element 506.

Figure 6:
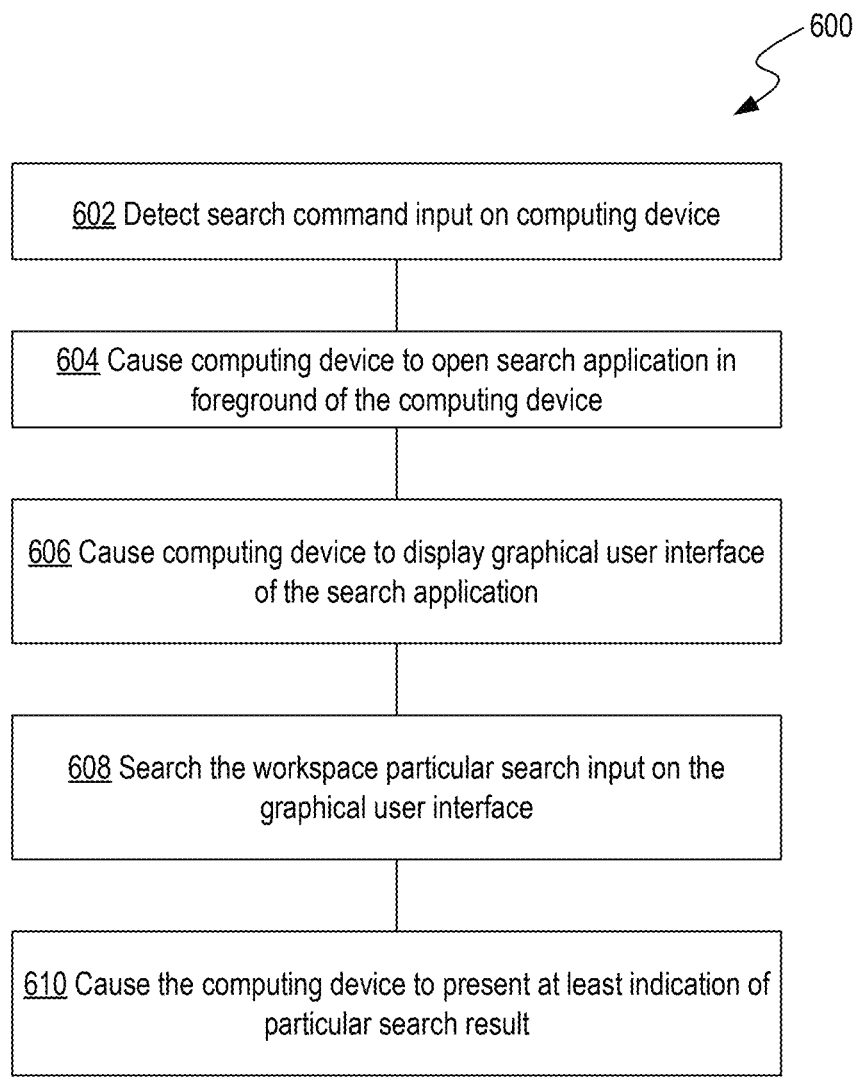
FIG. 6 is a flow diagram illustrating processes 600 for providing a command search for an integrated application.

FIG. 6 is a flow diagram illustrating processes 600 for providing a command search for an integrated application. The processes 600 can be performed by a system (e.g., the computer system 900 described with respect to FIG. 9). The processes 600 can include displaying a display view such as the display view described with respect to FIGS. 3A-3D.

At 602, the system can detect a search command input to a computing device. The computing system can be a laptop, personal computer, tablet computer, mobile phone, a virtual reality/augmented reality (AR/VR) device or other electronic device (e.g., as described with respect to FIG. 9). In some implementations, detecting the search command input to the computing device includes detecting input of a keyboard shortcut to the computing device (e.g., via input/out device 920 of FIG. 9). The keyboard shortcut can include, for example, pressing two or more notes of a keyboard simultaneously. The keyboard shortcut can be preset to cause the computing device to open the search application independent of whether the integrated application is running as a foreground or background application on the computing device. For example, in FIG. 3A, a user has provided a shortcut input or an input on the icon 312 while the integration application has been running as a background application and another application (e.g., an application associated with the user interface 310) was running as a foreground application.

In response to the search command being detected, at 604 system can cause the computing device to open a search application in a foreground of the computing device (e.g., a search application associated with the command search user interface 302 in FIG. 3A). The search application can be configured to search a workspace of an integrated application in a background of the computing device.

At 606, the system can cause the computing device to display a graphical user interface of the search application (e.g., the command search user interface 302 in FIG. 3A). The graphical user interface can be configured to receive search inputs (e.g., queries) used to search the workspace in the background of the computing system (e.g., a user input on the search bar 314) and present search results that satisfy the search inputs based on content of the workspace (e.g., the search results 318 in FIG. 3B).

At 608, the system can search the workspace based on a particular search input to the graphical user interface of the search application while the integrated application runs in the background of the computing device. For example, the integrated application runs in the background while the display view 300 in FIGS. 3A and 3B illustrates the user interface for the command search functions. As shown, the display view 300 does not include a user interface of the integrated application while performing the command search functions (i.e., the integrated application is not running in the foreground).

In some implementations, the particular search input is indicative of a type of block in a page of the workspace, a property of a block in a page of the workspace, an attribute of a block in a page of the workspace, a page of multiple pages of the workspace, or a member of multiple members of the workspace. For example, the search input can limit the command search by providing such an indication.

At 610, the system can cause the computing device to present at least an indication of a particular search result in the graphical user interface of the search application running in the foreground of the computing device. The particular search result can include a particular content of the workspace that satisfies the particular search input. In some implementations, the indication of the particular search result includes a link to the particular content of the workspace. For example, in FIG. 3B the search results 318 include links to content on the workspace that satisfies the search input provided on the search bar 314. In FIG. 3B, the command search user interface 302 also includes a preview section 316 for displaying a preview of content associated with a selected link of the search results 318.

The system can further detect the selection of the link to the particular content of the workspace. In response to the selection of the link, the system can cause the computing device to open the integrated application in the foreground of the computing device and present the particular content in the integrated application while in the foreground of the computing device (e.g., the workspace user interface 320).

In some implementations, the system can cause the computing device to identify a particular page of the workspace (e.g., the page 322 of the workspace user interface 302 in FIG. 3C) that includes the particular content that satisfies the particular search input. The workspace can include a hierarchy of pages including the particular page. For example, pages of the workspace correspond to blocks described in the Block Data Model section and pages can include hierarchically nested sub-pages. The system can cause the computing device to present the particular content in the particular page of the integrated application in the foreground of the computing device.

In some implementations, causing the computing device to present at least the indication of the particular search result in the graphical user interface of the search application includes causing the computing device to retrieve the particular content from the integrated application and present the particular content in the graphical user interface of the search application running in the foreground of the computing device. For example, as shown in FIG. 3C, the command search user interface 302 includes a preview section 316 that displays the content from the integrated application.

In some implementations, the system causes the graphical user interface to present a control (e.g., the workspace switcher 328 in FIG. 3D or another type of control or interface element) configured to enable the selection of a particular workspace from among multiple workspaces of the integrated application prior to the integrated application being searched. For example, a user can have access to multiple workspaces (a personal workspace, multiple team workspaces, organizational workspace) that include different content. The workspace switcher 328 allows a user to select the desired workspace. The search application can be configured to search only the particular workspace from among the multiple workspaces. The system can detect selection of the workspace from among the multiple workspaces. In some implementations, a search using the search application can have a scope limited to the one or more selected workspaces of the multiple workspaces. The one or more selected workspaces can include the workspace.

In some implementations, the workspace can be determined automatically based on a predefined selection or an automated selection. For example, the computer device can select a workspace that is associated with the last session of the integrated application. As another example, the computer device can select a workspace that has been defined in the account settings of the user account to be a default account for the command search or a workspace based on a particular criterion (e.g., the age of a workspace or frequency of using a workspace). If no particular detection of selection is detected on the list 330 associated with the workspace switcher 328 in FIG. 3D, the system can select a user account based on a predefined selection.

In some implementations, the system is further caused to cause the graphical user interface to present a switcher control prior to the integrated application being searched. The switcher control can be configured to enable the selection of a particular workspace from among multiple workspaces of the integrated application. The search application can be configured to search only the particular workspace of the multiple workspaces. The system can detect the selection of the workspace as the particular workspace from among the multiple workspaces (e.g., a user input on a particular workspace on the list 330).

In some implementations, the system can restrict the search application to search a preselected workspace of the integrated application prior to the content of the integrated application being searched. Any workspaces of the integrated application other than the preselected workspace can be excluded from the search by the search application. The workspace can be designated as the preselected workspace. For example, in response to a user indicating that the search should be limited to the "Notion" workspace in the list 330 in FIG. 3C, the search is performed on the content of the "Notion" workspace, and no other content is included in the search.

In some implementations, the system authorizes the search application to access the integrated application based on a common criterion that couples the search application with the integrated application prior to the content of the integrated application being searched. The system can authorize the search application to search the workspace of the integrated application based on the common criterion that couples the search application, the integrated application, and the workspace. The common criterion can include, for example, access permission or user account information. For example, the search application can be coupled with the integrated application via a user account.

In some implementations, the system is further caused to authorize the search application to access the integrated application based on a common electronic address set for each of the search application and the integrated application prior to the content of the integrated application being searched. The common electronic address can be a unique identifier for a user that ties together the workspace and the command search user interface. For example, the electronic address is an email address and the email address is coupled with the user's workspace account. The system can authorize the search application to search the workspace of the integrated application based on the electronic address set for each of the search application, the integrated application, and the workspace.

Figure 7:
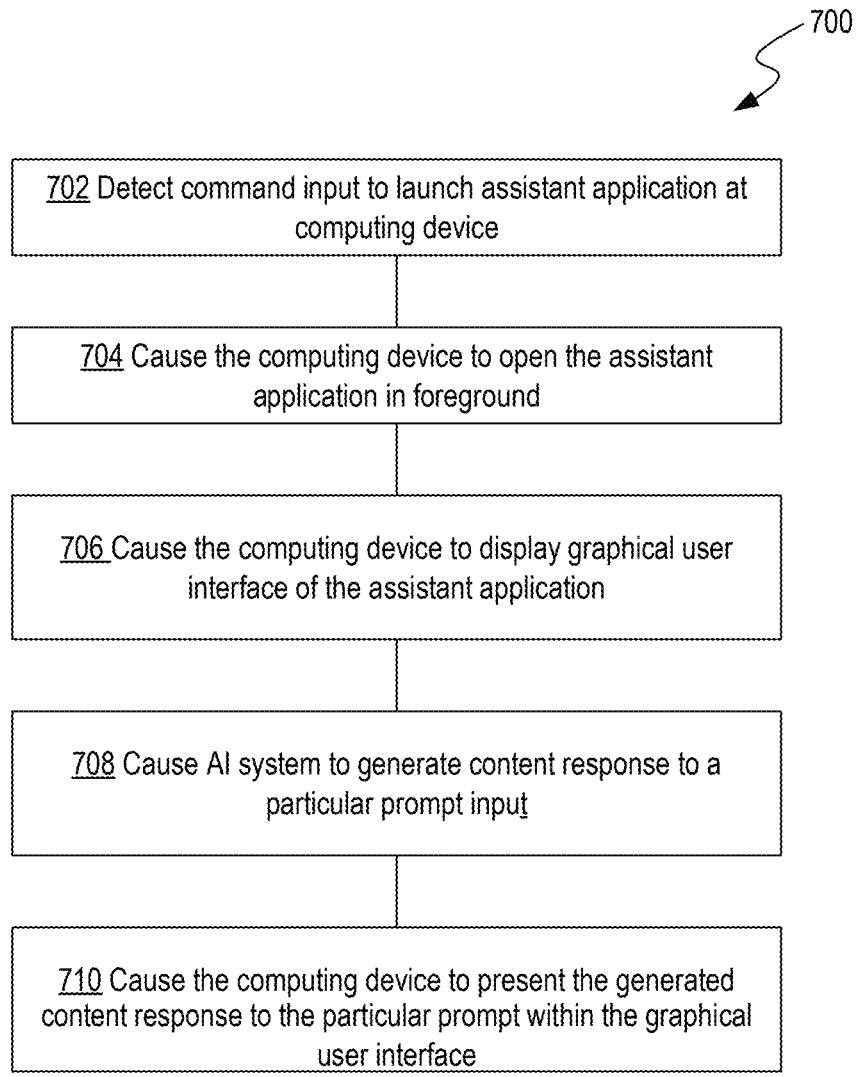
FIG. 7 is a flow diagram illustrating processes 700 for providing an AI assistant for an integrated application.

FIG. 7 is a flow diagram illustrating processes 700 for providing an AI assistant for an integrated application. The processes 700 can be performed by a system (e.g., the computer system 900 described with respect to FIG. 9). The processes 700 can include displaying a display view such as the display view described with respect to FIGS. 4A-4C.

At 702, a system can detect a command input to launch an assistant application at a computing device. In some implementations, detecting the command to launch the assistant application at the computing device includes causing the system to detect input of a keyboard shortcut to the computing device. The keyboard shortcut can be preset to cause the computing device to open the assistant application independent of whether the integrated application is running in the foreground or background of the computing device. For example, the command input can the a keyboard shortcut, as described with respect to the command search function with respect to FIG. 6. The command search can be associated with a first keyboard shortcut and the assistant application can be associated with a second keyboard shortcut that is different from the first keyboard shortcut. The assistant application can be configured to use an AI system (e.g., as described with respect to FIG. 2) to generate content responsive to prompts input and based on the content of an integrated application.

In response to the command being detected, at 704 the system can cause the computing device to open the assistant application in a foreground of the computing device. At 706, the system can cause the computing device to display a graphical user interface of the assistant application (e.g., the AI assistant user interface 402 in FIG. 4A which is displayed on the display view 300 as a foreground application). The graphical user interface can be configured to receive the prompts for the AI system and present generated content responsive to the prompt inputs. For example, the AI assistant interface element 304 in FIG. 4A is configured to receive prompts as inputs from a user. The AI generated content based on the prompt can be displayed on the AI assistant user interface 402, as illustrated by the created content 408 in FIG. 4B.

At 708, the system can cause the AI system to generate content responsive to a particular prompt input to the graphical user interface. The particular prompt can include a criterion for particular content of a workspace of the integrated application. The generated content can be responsive to the particular prompt and is based on the particular content of the workspace. For example, the prompt can include one or more identifiers for blocks including the content of the integrated application. In FIG. 4A, the prompt on the AI assistant interface element 304 includes instructions to create new content (e.g., a page) that describes software patents which is a criterion for the created content. In some implementations, the criterion is indicative of a type of block in a page of the workspace, a property of a block in a page of the workspace, an attribute of a block in a page of the workspace, a page of multiple pages of the workspace, or a member of multiple members of the workspace. In some implementations, the system can cause the computing device to retrieve the particular content from the integrated application and present the particular content in the graphical user interface of the assistant application running in the foreground of the computing device.

In some implementations, the system searches for the particular content of the workspace that satisfies the criterion. The search can be performed while the integrated application runs in the background of the computing device. The search can be performed prior to the AI system is being caused to generate content responsive to the particular prompt. For example, the content is searched in response to receiving the prompt in order to receive the content to be processed by the AI system. The system can input the particular content of the workspace into an LLM of the AI system and output the generated content from the LLM responsive to the particular prompt based on the particular content of the workspace.

At 710, the system can cause the computing device to present the generated content responsive to the particular prompt within the graphical user interface while the assistant application is running in the foreground of the computing device and the integrated application is running in the background of the computing device. As shown in FIG. 4B, the AI assistant user interface 402 including the created content 408 is displayed on the foreground in the display view 300. The display view 300 does not include the workspace user interface 320 because the integration application is running in the background.

In some implementations, the system is further caused to open the integrated application (e.g., the workspace user interface 320 in FIG. 4B) in the foreground of the computing device in response to user input received at the graphical user interface of the assistant application. The system can transfer the generated content (e.g., the created content 408) from the assistant application to the integrated application. The system can embed the generated content into the workspace of the integrated application (e.g., the crated content 408 is embedded on the page 414 in FIG. 4C).

In some implementations, the system further causes the assistant application to save the generated content to the workspace without opening the integrated application in a foreground of the computing device. For example, in response to a user input on the saving interface element 404 in FIG. 4B, the system can save the created content 408 without having the integrated application in the foreground.

In some implementations, the system causes the graphical user interface to present a control (e.g., workspace switcher 328 and the list 330 described with respect to FIG. 3D or another type of control) configured to enable selection from among multiple workspaces of the integrated application. The control can be presented prior to the computing device being caused to present the generated content responsive to the particular prompt. The assistant application can be configured to generate content based on a selected workspace of the multiple workspaces and detect the selection of the workspace from among the multiple workspaces.

In some implementations, the system causes the graphical user interface to present a switcher control (e.g., workspace switcher 328 and the list 330 described with respect to FIG. 3D) configured to enable selection of a particular workspace from among multiple workspaces of the integrated application. The switcher control can be presented prior to the computing device being caused to present the generated content responsive to the particular prompt. The assistant application can be configured to generate content based only on the particular workspace of the multiple workspaces. The system can detect selection of the workspace as the particular workspace from among the multiple workspaces. In some implementations, a scope of the assistant application to search content can be limited to the one or more selected workspaces of the multiple workspaces. The one or more selected workspaces can include the workspace.

In some implementations, the system further restricts the assistant application from searching content of workspaces other than the workspace of the integrated application for generating content responsive to prompts into to the graphical user interface. The restriction can be implemented prior to the computing device being caused to present the generated content responsive to the particular prompt. The workspace can be preselected for the assistant application.

In some implementations, the system authorizes the assistant application to access the integrated application based on a common criterion for each of the assistant application and the integrated application. The authorization can be performed prior to the computing device being caused to present the generated content responsive to the particular prompt. The system can authorize the assistant application to search the workspace of the integrated application based on the common criterion for each of the assistant application, the integrated application, and the workspace.

In some implementations, the system authorizes the assistant application to access the integrated application based on a common electronic address set for each of the assistant application and the integrated application. The authorization can be performed prior to the computing device being caused to present the generated content responsive to the particular prompt. The system can authorize a search function to search the workspace of the integrated application based on the electronic address set for each of the assistant application, the integrated application, and the workspace.

Figure 8:
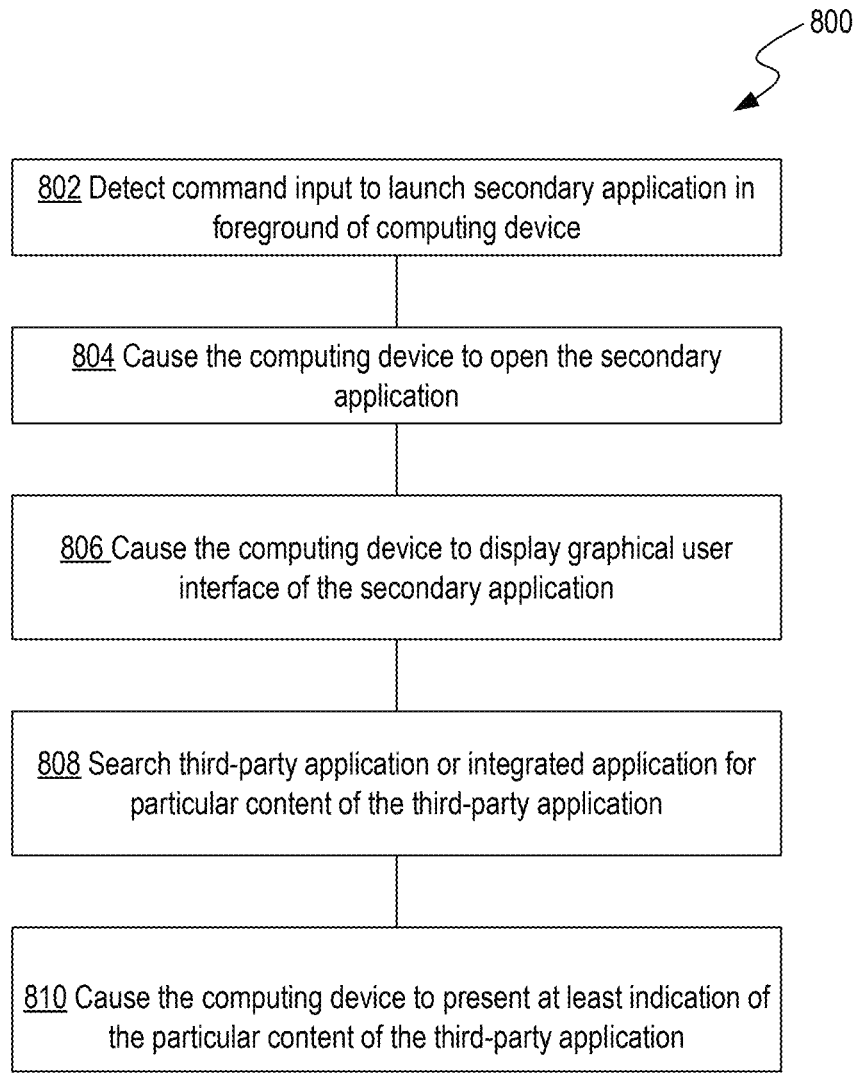
FIG. 8 is a flow diagram illustrating processes 800 for providing a command search and an AI assistant for a third-party application accessible by an integrated application.

FIG. 8 is a flow diagram illustrating processes 800 for providing a command search and an AI assistant for a third-party application accessible by an integrated application. The processes 800 can be performed by a system (e.g., the computer system 900 described with respect to FIG. 9). The processes 800 can include displaying a display view such as the display view described with respect to FIGS. 5A and 5B.

At 802, a system detects a command input to launch a secondary application in a foreground of a computing device. The secondary application can be configured to present content of an integrated application running in a background of the computing device and of a third-party application (e.g., connector applications described with respect to FIGS. 5A and 5B) accessible by the integrated application. The secondary application and the integrated application can be coupled via a unique user identifier and the third-party application is accessible by the integrated application via an application programming interface (API). The connecter applications can include, for example, applications that provide additional features and services to the integrated application such as a work tracking application, a project management application, a team communication application (e.g., a team email, messaging, or chat application), an electronic message application, a productivity application, or a file storage and synchronization application.

In some implementations, the secondary application is a search application (e.g., a search application associated with the command search user interface 302 in FIG. 3A) that enables searching for third-party content accessible by the integrated application. The search application can be configured to search for third-party content managed by the third-party application.

In some implementations, the secondary application is an AI assistant application (e.g., an AI assistant application associated with the AI assistant user interface 402 in FIG. 4A). The AI assistant application can be configured to generate content based on a prompt and the particular content of the third-party application.

In response to the command being detected, at 804 the system can cause the computing device to open the secondary application in the foreground of the computing device (e.g., as described with respect to FIG. 5A).

At 806, the system can cause the computing device to display a graphical user interface of the secondary application at the computing device. The graphical user interface can be configured to receive user inputs and present content responsive to the user inputs. The graphical user interface of the secondary application can include, for example, the command search user interface 302 in FIG. 3A and the AI assistant user interface 402 in FIG. 4A).

In response to a particular user input received at the graphical user interface, at 808 the system can search the third-party application or the integrated application for particular content of the third-party application that satisfies a criterion included in the particular user input.

At 810, the system can cause the computing device to present at least an indication of the particular content of the third-party application within the graphical user interface of the secondary application running in the foreground of the computing device. For example, in FIG. 5B the content 502 on the AI assistant user interface 402 includes links 504 (e.g., URL links) that point to the content on the connector application. In some implementations, causing the computing device to present at least the indication of the particular content in the graphical user interface includes causing the system to retrieve the particular content from the third-party application or the integrated application and presenting the particular content in the graphical user interface of the secondary application. The secondary application can run in the foreground of the computing device.

In some implementations, the indication of the particular content includes a link to the particular content of the third-party application (e.g., the links 504 in FIG. 5B). The system can detect the selection (e.g., a user input) of the link to the particular content. In response to the selection of the link, the system can cause the computing device to open the integrated application in the foreground of the computing device (e.g., the workspace user interface 320 as described with respect to FIGS. 3C and 4C). The system can cause the computing device to present the particular content of the third-party application in the integrated application while in the foreground of the computing device.

In some implementations, in response to the selection of the link, the system can cause the computing device to identify a workspace page of the integrated application that includes the particular content imported from the third-party application (e.g., similar to the page 322 in FIG. 3C except that the content of the page 322 can include content important from the third-party application. The system can cause the computing device to present the particular content in the workspace page in the foreground of the computing device.

In some implementations, the system further causes the graphical user interface to present a control (e.g., the workspace switcher 328 in FIG. 3D or another type of control) configured to enable selection from among multiple workspaces of the integrated application. The graphical user interface can be presented prior to the content of the integrated application being searched. The secondary application can be configured to search only a selected workspace of the multiple workspaces. The system can detect the selection of a workspace from among the multiple workspaces. In some implementations, the control can be presented prior to the particular content of the third-party application being searched. The search can have a scope limited to the one or more selected workspaces of the multiple workspaces.

In some implementations, the system can further cause the graphical user interface to present a switcher control (e.g., the workspace switcher 328 in FIG. 3D) configured to enable the selection of a particular workspace from among multiple workspaces of the integrated application. The switcher control can be presented prior to the particular content of the third-party application being searched. The secondary application can be configured to search only the particular workspace of the multiple workspaces. The system can detect the selection of the particular workspace from among the multiple workspaces.

In some implementations, the system can further restrict the secondary application to search a preselected workspace of the integrated application. The restricting can be performed prior to the particular content of the third-party application being searched. Any workspaces of the integrated application other than the preselected workspace can be excluded from the search by the secondary application.

In some implementations, detecting the command input to launch the secondary application includes causing the system to detect input of a keyboard shortcut to the computing device. The keyboard shortcut can be preset to cause the computing device to open the secondary application independent of whether the integrated application is running in the foreground or background of the computing device.

In some implementations, the system can further cause an AI system to generate content responsive to a prompt input to the graphical user interface and based on the particular content of a third-party application. The AI system can be caused to generate the content prior to the computing device being caused to present at least the indication of the particular content of the third-party application. The system can cause the computing device to present the generated content within the graphical user interface of the secondary application. In some implementations, the system can open the integrated application in the foreground of the computing device. The system can transfer the generated content from the secondary application to the integrated application and embed the generated content into a workspace of the integrated application. The system can cause the secondary application to save the generated content to the integrated application while in the background of the computing device. For example, in response to a user input on the saving interface element 404 in FIG. 4B, the system can save the created content 408 without having the integrated application in the foreground.

In some implementations, the system can cause the computing device to retrieve the particular content from the third-party application and present the particular content in the graphical user interface of the secondary application running in the foreground of the computing device. The retrieving can be performed via the API coupling the secondary application and the integrated application.

In some implementations, the third-party application includes a work tracking application, a project management application, a team communication application, an electronic message application, a productivity application, or a file storage and synchronization application.

Computer System

Figure 9:
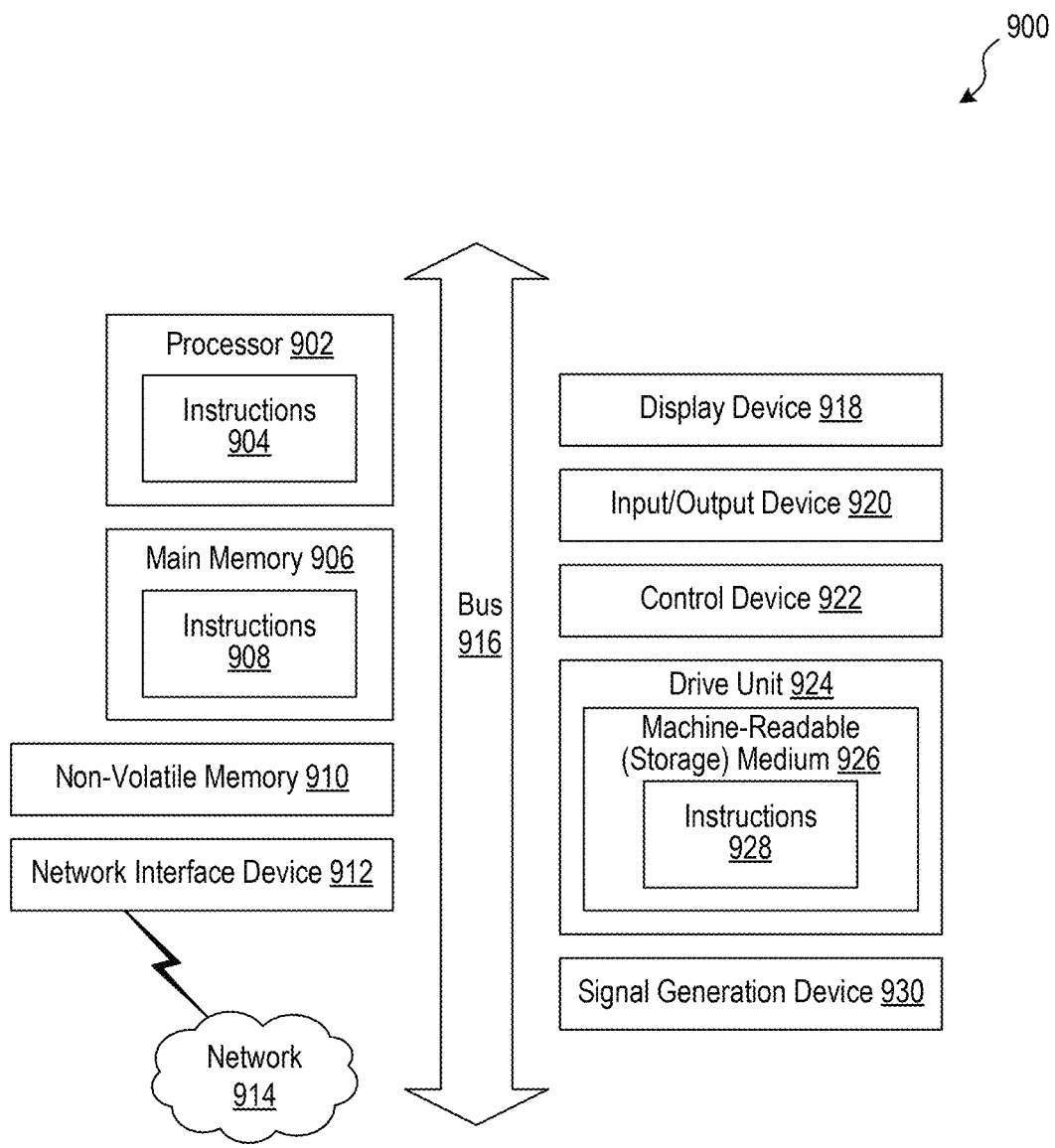
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, a display device 918, an input/output device 920, a control device 922 (e.g., keyboard and pointing device), a drive unit 924 that includes a machine-readable (storage) medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computer system 900 can share a similar architecture with that of a server computer, personal computer (PC), tablet computer, mobile telephone, wearable electronic device, network-connected ("smart") device (e.g., a television or home assistant device), AR/VR system (e.g., head-mounted display), or any electronic device capable of executing a set of instructions that specify action(s) to be taken by the computer system 900. In some implementations, the computer system 900 can be an embedded computer system, a system-on-chip (SOC), a single-board computer (SBC) system, or a distributed system such as a mesh of computer systems or include one or more cloud components in one or more networks. Where appropriate, one or more computer systems 900 can perform operations in real time, near real time, or in batch mode.

The network interface device 912 enables the computer system 900 to mediate data in a network 914 with an entity that is external to the computer system 900 through any communication protocol supported by the computer system 900 and the external entity. Examples of the network interface device 912 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable medium 926 can include any medium that is capable of storing, encoding, or carrying a set of instructions for execution by the computer system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computer system 900 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A non-transitory, computer-readable storage medium comprising instructions recorded thereon, wherein the instructions, when executed by at least one data processor of a system, cause the system to:
   detect a search command input to a computing device;
   in response to the search command being detected, cause the computing device to:
      open a search application in a foreground of the computing device,
         wherein the search application is configured to search a workspace of an integrated application in a background of the computing device; and
      display a graphical user interface of the search application on the computing device,
         wherein the graphical user interface is configured to receive search inputs used to search the workspace in the background of the computing system and present search results that satisfy the search inputs based on content of the workspace;
   search the workspace based on a particular search input to the graphical user interface of the search application while the integrated application runs in the background of the computing device; and
   cause the computing device to present at least an indication of a particular search result in the graphical user interface of the search application running in the foreground of the computing device,
      wherein the particular search result includes particular content of the workspace that satisfies the particular search input.

2. The non-transitory, computer-readable storage medium of claim 1, wherein the indication of the particular search result includes a link to the particular content of the workspace, the system being further caused to:
   detect selection of the link to the particular content of the workspace;
   in response to the selection of the link, cause the computing device to:
      open the integrated application in the foreground of the computing device; and
      present the particular content in the integrated application while in the foreground of the computing device.

3. The non-transitory, computer-readable storage medium of claim 1, wherein the indication of the particular search result includes a link to the particular content of the workspace, the system being further caused to:
   detect selection of the link to the particular content of the workspace;
   in response to the selection of the link, cause the computing device to:
      identify a particular page of the workspace that includes the particular content that satisfies the particular search input,
         wherein the workspace includes a hierarchy of pages including the particular page; and
      present the particular content in the particular page of the integrated application in the foreground of the computing device.

4. The non-transitory, computer-readable storage medium of claim 1, wherein to cause the computing device to present at least the indication of the particular search result in the graphical user interface of the search application comprises causing the computing device to:
   retrieve the particular content from the integrated application; and
   present the particular content in the graphical user interface of the search application running in the foreground of the computing device.

5. The non-transitory, computer-readable storage medium of claim 1, wherein the system is further caused to, prior to the integrated application being searched:
   cause the graphical user interface to present a control configured to enable selection of a particular workspace from among multiple workspaces of the integrated application,
      wherein the search application is configured to search only the particular workspace from among the multiple workspaces; and
   detect selection of the workspace from among the multiple workspaces.

6. The non-transitory, computer-readable storage medium of claim 1, wherein the system is further caused to, prior to the integrated application being searched:
   cause the graphical user interface to present a switcher control configured to enable selection of a particular workspace from among multiple workspaces of the integrated application,
      wherein the search application is configured to search only the particular workspace of the multiple workspaces;
   detect selection of the workspace as the particular workspace from among the multiple workspaces.

7. The non-transitory, computer-readable storage medium of claim 1, wherein the system is further caused to, prior to the content of the integrated application being searched:
   cause the graphical user interface to present a control configured to enable selection of one or more workspaces from among multiple workspaces of the integrated application,
      wherein a search using the search application has a scope limited to the one or more selected workspaces of the multiple workspaces, and
      wherein the one or more selected workspaces include the workspace.

8. The non-transitory, computer-readable storage medium of claim 1, wherein the system is further caused to, prior to the content of the integrated application being searched:
 restrict the search application to search a preselected workspace of the integrated application,
  wherein any workspaces of the integrated application other than the preselected workspace are excluded from search by the search application, and
  wherein the workspace is designated as the preselected workspace.

9. The non-transitory, computer-readable storage medium of claim 1, wherein the system is further caused to, prior to the content of the integrated application being searched:
 authorize the search application to access the integrated application based on a common criterion that couples the search application with the integrated application; and
 authorize the search application to search the workspace of the integrated application based on the common criterion that couples the search application, the integrated application, and the workspace.

10. The non-transitory, computer-readable storage medium of claim 1, wherein the system is further caused to, prior to the content of the integrated application being searched:
 authorize the search application to access the integrated application based on a common electronic address set for each of the search application and the integrated application; and
 authorize the search application to search the workspace of the integrated application based on the electronic address set for each of the search application, the integrated application, and the workspace.

11. The non-transitory, computer-readable storage medium of claim 1, wherein to detect the search command input to the computing device comprises causing the system to:
 detect input of a keyboard shortcut to the computing device,
  wherein the keyboard shortcut is preset to cause the computing device to open the search application independent of whether the integrated application is running as a foreground or background application on the computing device.

12. The non-transitory, computer-readable storage medium of claim 1, wherein the particular search input is indicative of:
 a type of block in a page of the workspace,
 a property of a block in a page of the workspace,
 an attribute of a block in a page of the workspace,
 a page of multiple pages of the workspace, or
 a member of multiple members of the workspace.

13. A computer-implemented method performed by a system, the method comprising:
 detecting a search command input to a computing device;
 in response to the search command being detected, causing the computing device to:
  open a search application in a foreground of the computing device,
   wherein the search application is configured to search blocks of an integrated application in a background of the computing device, and
   wherein the blocks include searchable content; and
  display a graphical user interface of the search application on the computing device,
   wherein the graphical user interface is configured to receive search inputs used to search the blocks in the background of the computing system and present search results that satisfy the search inputs based on content of the blocks;
 searching the blocks based on a particular search input to the graphical user interface of the search application while the integrated application runs in the background of the computing device; and
 causing the computing device to present at least an indication of a particular search result in the graphical user interface of the search application running in the foreground of the computing device,
  wherein the particular search result includes particular content of the blocks that satisfies the particular search input.

14. The method of claim 13, wherein the indication of the particular search result includes a link to the particular content of the integrated application, the method further comprising:
 detecting selection of the link to the particular content;
 in response to the selection of the link, causing the computing device to:
  open the integrated application in the foreground of the computing device; and
  present the particular content in the integrated application while in the foreground of the computing device.

15. The method of claim 13, wherein the indication of the particular search result includes a link to the particular content of the integrated application, the method further comprising:
 detecting selection of the link to the particular content;
 in response to the selection of the link, causing the computing device to:
  identify a particular page of the integrated application that includes the particular content that satisfies the particular search input,
   wherein the integrated application includes a hierarchy of pages including the particular page; and
  present the particular content in the particular page of the integrated application in the foreground of the computing device.

16. The method of claim 13, wherein to cause the computing device to present at least the indication of the particular search result in the graphical user interface of the search application comprises causing the computing device to:
 retrieve the particular content from the integrated application; and
 present the particular content in the graphical user interface of the search application running in the foreground of the computing device.

17. A system, comprising:
 at least one hardware processor; and
 at least one non-transitory memory storing instructions, which, when executed by the at least one hardware processor, cause the system to:
 detect a search command input to a computing device;
 in response to the search command being detected:
  open a search application in a foreground of the computing device,
   wherein the search application is configured to search blocks of an integrated application in a background of the computing device, and
   wherein the blocks include searchable content; and
  display a graphical user interface of the search application on the computing device, wherein the graphical user interface is configured to receive search inputs used to search the blocks in the background of the computing system and present search results that satisfy the search inputs based on content of the blocks;
cause a server in communication with the computing device to search the blocks based on a particular search input to the graphical user interface of the search application while the integrated application runs in the background of the computing device; and
present at least an indication of a particular search result in the graphical user interface of the search application running in the foreground of the computing device,
wherein the particular search result includes particular content of the blocks that satisfies the particular search input.

18. The system of claim 17, wherein the indication of the particular search result includes a link to the particular content of the integrated application, the system being further caused to:
detect selection of the link to the particular content;
in response to the selection of the link, cause the computing device to:
open the integrated application in the foreground of the computing device; and
present the particular content in the integrated application while in the foreground of the computing device.

19. The system of claim 17, wherein the indication of the particular search result includes a link to the particular content of the integrated application, the system being further caused to:
detect selection of the link to the particular content;
in response to the selection of the link, cause the computing device to:
identify a particular page of the integrated application that includes the particular content that satisfies the particular search input,
wherein the integrated application includes a hierarchy of pages including the particular page; and
present the particular content in the particular page of the integrated application in the foreground of the computing device.

20. The system of claim 17, wherein to cause the computing device to present at least the indication of the particular search result in the graphical user interface of the search application comprises causing the computing device to:
retrieve the particular content from the integrated application; and
present the particular content in the graphical user interface of the search application running in the foreground of the computing device.

* * * * *